(12) United States Patent
Kalyanaraman et al.

(10) Patent No.: US 7,743,602 B2
(45) Date of Patent: Jun. 29, 2010

(54) REFORMER ASSISTED LEAN $NO_x$ CATALYST AFTERTREATMENT SYSTEM AND METHOD

(75) Inventors: Mohan Kalyanaraman, Media, PA (US); Paul W. Park, Peoria, IL (US); Christie S. Ragle, Havana, IL (US)

(73) Assignees: ExxonMobil Research And Engineering Co., Annandale, NJ (US); Caterpillar Inc., Peoria, IL (US)

( * ) Notice: Subject to any disclaimer, the term of this patent is extended or adjusted under 35 U.S.C. 154(b) by 971 days.

(21) Appl. No.: 11/514,544

(22) Filed: Sep. 1, 2006

(65) Prior Publication Data

US 2008/0053073 A1    Mar. 6, 2008

Related U.S. Application Data

(63) Continuation-in-part of application No. 11/157,729, filed on Jun. 21, 2005.

(51) Int. Cl.
*F01N 3/00* (2006.01)
(52) U.S. Cl. .............................. 60/286; 60/284; 60/285; 60/295; 60/301; 60/300
(58) Field of Classification Search .................... 60/274, 60/275, 723; 422/173; 48/61; 502/527.11; 431/7, 170
See application file for complete search history.

(56) References Cited

U.S. PATENT DOCUMENTS 4,934,142 A    6/1990    Hayashi et al.

(Continued)

FOREIGN PATENT DOCUMENTS

EP    0702 997 A1    3/1996

(Continued)

OTHER PUBLICATIONS

Shigeo Satokawa et al.; "Promotion Effect of $H_2$ On The Low Temperature Activity Of The Selective Reduction Of NO By Light Hydrocarbons Over $Ag/Al_2O_3$"; www.sciencedirect.com; Elsevier Applied Catalysis B: Environmental 42 (2003), Aug. 30, 2002; pp. 179-186.

(Continued)

*Primary Examiner*—Thomas E Denion
*Assistant Examiner*—Jesse Bogue
(74) *Attorney, Agent, or Firm*—Water & Kipnes, P.C.; Kenneth Water

(57) ABSTRACT

A method and apparatus for catalytically processing a gas stream passing therethrough to reduce the presence of $NO_x$ therein, wherein the apparatus includes a first catalyst composed of a silver-containing alumina that is adapted for catalytically processing the gas stream at a first temperature range, a second catalyst composed of a copper-containing zeolite located downstream from the first catalyst, wherein the second catalyst is adapted for catalytically processing the gas stream at a lower second temperature range relative to the first temperature range, a hydrocarbon compound for injection into the gas stream upstream of the first catalyst to provide a reductant, and a reformer for reforming a portion of the hydrocarbon compound into $H_2$ and/or oxygenated hydrocarbon for injection into the gas stream upstream of the first catalyst. The second catalyst is adapted to facilitate the reaction of reducing NOx into $N_2$, whereby the intermediates are produced via the first catalyst reacting with NOx and hydrocarbons.

30 Claims, 14 Drawing Sheets

U.S. PATENT DOCUMENTS

| | | | | |
|---|---|---|---|---|
| 5,223,236 | A | 6/1993 | Inoue et al. | 423/213.2 |
| 5,425,332 | A | 6/1995 | Rabinovich et al. | 123/3 |
| 5,437,250 | A | 8/1995 | Rabinovich et al. | 123/3 |
| 5,443,803 | A * | 8/1995 | Mizuno et al. | 423/213.2 |
| 5,599,758 | A | 2/1997 | Guth et al. | 502/34 |
| 5,714,130 | A | 2/1998 | Saito et al. | 423/239.1 |
| 5,727,385 | A | 3/1998 | Hepburn | 60/297 |
| 5,741,468 | A | 4/1998 | Saito et al. | |
| 5,776,423 | A | 7/1998 | Feeley et al. | |
| 5,780,002 | A | 7/1998 | Miyadera et al. | 423/239.1 |
| 5,878,567 | A | 3/1999 | Adamczyk et al. | |
| 5,882,607 | A | 3/1999 | Miyadera et al. | 422/177 |
| 5,908,806 | A * | 6/1999 | Kharas | 502/64 |
| 5,910,097 | A | 6/1999 | Boegner et al. | 60/278 |
| 5,921,076 | A | 7/1999 | Krutzsch et al. | 60/274 |
| 5,948,377 | A | 9/1999 | Sung | 423/213.5 |
| 5,980,844 | A * | 11/1999 | Kharas | 423/213.2 |
| 6,029,623 | A | 2/2000 | Weissman et al. | |
| 6,125,629 | A | 10/2000 | Patchett | 60/286 |
| 6,176,078 | B1 | 1/2001 | Balko et al. | 60/274 |
| 6,245,307 | B1 | 6/2001 | Inui et al. | 423/231.5 |
| 6,260,353 | B1 | 7/2001 | Takahashi | 53/94 |
| 6,314,722 | B1 | 11/2001 | Matros et al. | 60/274 |
| 6,363,716 | B1 | 4/2002 | Balko et al. | 60/286 |
| 6,475,350 | B2 | 11/2002 | Palekar et al. | 204/164 |
| 6,560,958 | B1 | 5/2003 | Bromberg et al. | 60/275 |
| 6,592,833 | B1 | 7/2003 | Kharas | 423/239.1 |
| 6,679,051 | B1 | 1/2004 | van Nieustadt et al. | 60/286 |
| 6,703,343 | B2 | 3/2004 | Park | 502/355 |
| 6,706,660 | B2 | 3/2004 | Park | 502/304 |
| 6,718,753 | B2 | 4/2004 | Bromberg et al. | 60/275 |
| 6,758,035 | B2 | 7/2004 | Smaling | 60/285 |
| 6,810,658 | B2 | 11/2004 | Kaupert et al. | 60/274 |
| 6,823,662 | B1 | 11/2004 | Yamamoto et al. | 53/94 |
| 6,843,054 | B2 | 1/2005 | Taylor, III et al. | 60/275 |
| 6,846,471 | B2 | 1/2005 | Hotta et al. | 423/239.1 |
| 6,895,746 | B2 | 5/2005 | Buglass et al. | 60/286 |
| 6,957,528 | B1 | 10/2005 | Cho | 60/275 |
| 6,959,542 | B2 | 11/2005 | Taylor, III et al. | 60/295 |
| 6,968,678 | B2 | 11/2005 | Le Leux et al. | 60/280 |
| 7,063,642 | B1 * | 6/2006 | Hu et al. | 477/100 |
| 7,093,428 | B2 * | 8/2006 | LaBarge et al. | 60/286 |
| 2001/0031699 | A1 | 10/2001 | Matsumoto et al. | |
| 2002/0051742 | A1 | 5/2002 | Hotta et al. | 423/213.5 |
| 2002/0091061 | A1 | 7/2002 | Labarge et al. | 502/63 |
| 2003/0047146 | A1 | 3/2003 | Daniel et al. | 123/3 |
| 2003/0047147 | A1 | 3/2003 | Daniel et al. | 123/3 |
| 2003/0089337 | A1 | 5/2003 | Cohn et al. | 123/435 |
| 2003/0118960 | A1 | 6/2003 | Balmer-Millar et al. | 431/146 |
| 2003/0170154 | A1 | 9/2003 | Inman et al. | 422/186.04 |
| 2004/0050345 | A1 | 3/2004 | Bauer | 123/3 |
| 2004/0099226 | A1 | 5/2004 | Bromberg et al. | 123/3 |
| 2004/0126286 | A1 | 7/2004 | DeRuyter | 422/177 |
| 2004/0146458 | A1 | 7/2004 | Weissman et al. | 423/651 |
| 2004/0187483 | A1 | 9/2004 | Dalla Betta et al. | 60/286 |
| 2004/0235651 | A1 | 11/2004 | Uenishi et al. | 502/304 |
| 2005/0229872 | A1 | 10/2005 | Lange | 123/3 |
| 2005/0247049 | A1 | 11/2005 | Kaboord et al. | 60/286 |
| 2006/0112678 | A1 * | 6/2006 | Kaboord et al. | 60/274 |
| 2006/0286012 | A1 | 12/2006 | Socha et al. | |
| 2007/0059223 | A1 | 3/2007 | Golunski et al. | 53/94 |

FOREIGN PATENT DOCUMENTS

| | | |
|---|---|---|
| EP | 0 730 900 A1 | 9/1996 |
| EP | 0 971 102 A2 | 1/2000 |
| EP | 1 094 206 A2 | 4/2001 |
| EP | 1 132 585 A2 | 9/2001 |
| JP | 05103953 A | 4/1993 |
| JP | 06238169 A | 8/1994 |
| JP | 07194973 A | 8/1995 |
| JP | 09057064 A | 3/1997 |
| JP | 09085057 A | 3/1997 |
| JP | 10328567 A | 12/1998 |
| WO | WO 00/64566 | 11/2000 |
| WO | WO 2005/016496 A1 | 2/2005 |

OTHER PUBLICATIONS

M. Richter et al.; "The Effect Of Hydrogen On The Selective Catalytic Reduction of NO In Excess Oxygen Over $Ag/Al_2O_3$"; www.sciencedirect.com; Elsevier Applied Catalysis B: Environmental 51 (2004), Apr. 24, 2004; pp. 261-274.

John Cavataio and Erdogan Gulari; "Selective Catalytic Reduction of $NO_x$ Over Silver and Platinum Alumina Catalysts"; CLEERS Workshop; University of Michigan, Ford Motor Company; May 2, 2002; pp. 1-31.

Kari Eränen et al.; "Continuous reduction of NO with Octane Over a Silver/Alumina Catalyst in Oxygen-Rich Exhaust Gases: Combined Heterogeneous and Surface-Mediated Homogeneous Reactions"; www.sciencedirect.com; Academic Press, Journal of Catalysis 219 (2003) Apr. 18, 2003; pp. 25-40.

Kalle Arve, et al.; "Kinetic Considerations of $H_2$ Assisted Hydrocarbon Selective Catalytic Reduction of NO over $Ag/Al_2O_3$ 1. Kinetic Behavior"; www.sciencedirect.com Applied Catalysis A: General 303 (2006) Mar. 9, 2006; pp. 96-102.

Rappe et al., "Combination of low and high temperature catalytic materials to obtain broad temperature coverage for plasma-facilitated NOx reduction," Catalysis Today 89 (Feb. 3, 2004), pp. 143-150.

* cited by examiner

REFORMER ASSISTED LEAN $NO_x$ CATALYST AFTERTREATMENT SYSTEM AND METHOD

RELATED APPLICATION

This present Application takes priority from and is a Continuation-In-Part from co-pending Non-Provisional Application Ser. No. 11/157,729 filed on Jun. 21, 2005, for "Method And Apparatus For Combination Catalyst For Reduction Of $NO_x$ In Combustion Products." The teachings of the related Application are incorporated herein to the extent they do not conflict herewith.

U.S. GOVERNMENT RIGHTS

This Invention was made with government support under the terms of Contract No. DE-AC05-00OR22725 awarded by the Department of Energy. The government may have certain rights in this invention

FIELD OF THE DISCLOSURE

The present disclosure relates generally to a system and method for removing pollutant gases from the exhaust gas stream formed by a combustion process such as required in the operation of internal combustion engines, furnaces, power plants, and so forth, and is more particularly related to the use of reductants and catalysts in removing nitrogen oxide ($NO_x$) from the exhaust gases resulting from a combustion process.

BACKGROUND OF THE DISCLOSURE

A continuing effort has been made over the years for developing methods and systems for removing pollutant gases from exhaust gases produced by combustion equipment. In recent years, environmental regulations have been made law in numerous countries around the world in an effort to reduce the emission of pollutant gases into the atmosphere from combustion equipment. Of major concern is the production of nitrogen oxides ($NO_x$) by motor vehicles driven by internal combustion engines, such as gasoline driven engines, and particularly diesel engines. Other combustion apparatus are also of concern, such as furnaces installed in factories, commercial and home heating devices, power plant equipment, and so forth.

During the combustion process in such equipment when nitrogen in the air reacts with oxygen within a combustion chamber, under the high temperature and pressure conditions that typically exist therein, such as in the cylinder of an internal combustion engine, nitrogen oxides ($NO_x$) are produced, which typically include either one or a combination of nitrogen monoxide and nitrogen dioxide, commonly referred to as $NO_x$ emissions. The $NO_x$ emissions are major atmospheric pollutants that cause smog, and acid rain. The major industrialized countries throughout the world have instituted regulations for reducing $NO_x$ emissions.

As a result, a major effort has been ongoing over an extended period of time for developing methods and systems to substantially eliminate the emission into the atmosphere of nitrogen oxides or $NO_x$ via exhaust gas streams from combustion equipment. Recognizing that automobile emissions are a major source of air pollution, in the 1966 automobile model year, the state of California passed regulations requiring the use of exhaust emission control systems in vehicles sold in California. Similar regulations were instituted throughout the United States by automotive model year 1968.

In combustion processes, the "perfect mixture" of a fuel and air is referred to in thermodynamics by the term "stoichiometric." This is the point at which the amount of air is just enough to combust all of the fuel, with no excess oxygen remaining. For many reasons, internal combustion engines cannot be run stoichiometrically, and are typically run lean, where there is an excess of oxygen to fuel relative to the stoichiometric condition. Although both gasoline and diesel internal combustion engines are typically run as lean-burn engines, such a condition is most often found in operating diesel engines, and leads to the emission of undesirable amounts of $NO_x$ in the exhaust gases from such engines. At times engines may run rich, that is with an excess of fuel relative to oxygen. Note that for gasoline, the stoichiometric mixture is 14.6:1. Even under these conditions, some nitrogen from the air can react with oxygen to form NOx.

The exhaust gas stream from lean-burn engines contain significant amounts of oxygen, thereby preventing the efficient removal of $NO_x$ from the gas stream through use of conventional exhaust catalysts such as a "3-Way Catalyst." As a result, $NO_x$ trap or $NO_x$ storage/reduction systems have been developed to assist in removing $NO_x$ from current lean-burn engines. However, these systems must rely on close engine control for alternating between rich and lean conditions in the exhaust gas stream. During the lean phases, the catalyst employed stores $NO_x$. During the rich phases, the catalyst reduces $NO_x$ to $N_2$. Also, HC-SCR systems have been developed as retrofits for use in reducing $NO_x$ from the exhaust gas stream of internal combustion engines, but such systems have found only limited use.

An attractive aftertreatment technology for active NOx control from an implementation point of view is one based on a catalyst system that utilizes on-board hydrocarbon (e.g. diesel fuel) as the source of the required supplemental reductant. The advantages of a Lean-NOx catalyst technology are its simplicity in terms of engine control, aftertreatment system and infrastructure implementation requirements compared to other technologies, such as NOx adsorbers or urea SCR. However, the state-of-the-art Lean-NOx technology for diesel engine applications is only able to achieve approximately 25-30% NOx reduction when supplemental diesel fuel is injected into the exhaust stream. Zeolites and noble metal based catalysts are the most common catalyst materials for Lean-NOx technology developed by catalyst suppliers for real applications with full size bricks. Poor hydrothermal stability, low NOx reduction selectivity and high sulfate formation are major issues of these materials for application as NOx control of diesel exhaust, particularly when applied to diesel exhaust at engine modes that produce low temperatures.

Accordingly, there is a need in the art for improved methods and apparatus for removing $NO_x$ from the exhaust gas stream of a combustion device, such as internal combustion engines.

SUMMARY OF THE DISCLOSURE

The present disclosure relates to a system and method for the combined use of reductant and catalytic aftertreatment processing of a gas stream to remove or at least substantially reduce $NO_x$ compounds therefrom. In particular, the apparatus of the present disclosure efficiently processes the exhaust gases from lean-burn engines such as diesel engines, for example, whose exhaust gases exhibit a relatively large proportion of oxygen content, but is not limited thereto, and can be used to remove $NO_x$ from the exhaust gases of other combustion driven apparatus. In one embodiment, a reformer is used to convert part of a hydrocarbon into a reductant such as hydrogen and/or oxygenated hydrocarbon for injection into an exhaust gas stream over a lean $NO_x$ catalyst. In a preferred embodiment the lean $NO_x$ catalyst is a dual catalyst.

The apparatus of the present disclosure comprises generally a first catalyst adapted to operate at an optimal first temperature, and a second catalyst adapted to operate at a lower optimal second temperature relative to the first temperature. The first catalyst is positioned upstream from the second catalyst in a manner which enables the exhaust gases in the form of a gas stream to flow from the first catalyst to the second catalyst. The first and second catalysts may be arranged immediately one after another or in a spaced-apart relationship. A reformer is used to convert part of a hydrocarbon compound into a reductant for injection into the gas stream before the first and second catalysts, to allow for lower temperature, higher efficiency operation of the catalysts.

In one embodiment of the present disclosure, the reductant is hydrogen ($H_2$), and/or oxygenated hydrocarbon, which acts to enhance the $NO_x$ removal activity of the apparatus.

In a preferred embodiment of the present disclosure, the first catalyst is composed of a metal-containing alumina material, the second catalyst is composed of a metal-containing zeolite material, and the reformer is for reforming a hydrocarbon compound, such as diesel fuel, into $H_2$, CO, or oxygenated hydrocarbon. During operation, the exhaust gases are passed through the apparatus injected with both hydrogen gas, and a hydrocarbon compound reductant, and sequentially processed by the first and second catalysts. The first and second catalysts, in combination, operate to remove or at least substantially reduce the NOx compounds and convert them into environmentally compatible by-products in a simple, cost efficient manner, with lower fuel penalty.

In one aspect of the present disclosure, there is provided an apparatus for catalytically processing a gas stream passing therethrough to reduce the presence of NOx therein, the apparatus comprising:

a reformer for reforming a hydrocarbon compound into $H_2$ and CO reductants;

means for injecting either $H_2$, CO, or oxygenated hydrocarbon reductants into the gas stream;

a first catalyst having a first optimal processing temperature range for catalytically processing the reductant injected gas stream; and a second catalyst located downstream from the first catalyst, said second catalyst having a second lower optimal processing temperature range relative to the first temperature range for catalytically processing the gas stream subsequent to the first catalyst.

In a particular aspect of the present disclosure, there is provided an apparatus for catalytically processing a gas stream passing therethrough to reduce the presence of $NO_x$ therein, the apparatus comprising:

means for injecting $H_2$ into the gas stream;

means for injecting a hydrocarbon into the gas stream;

a Plasmatron for reforming a hydrocarbon compound into $H_2$, CO, or oxygenated hydrocarbon reductants;

a first catalyst comprising metal-containing alumina, said first catalyst having a first optimal processing temperature range for catalytically processing the hydrogen injected gas stream; and a second catalyst comprising metal-containing zeolite located downstream from the first catalyst, said second catalyst having a second lower optimal processing temperature range relative to the first optimal processing temperature range for catalytically processing the gas stream subsequent to the first catalyst.

In another aspect of the present disclosure, there is provided a method for catalytically processing a gas stream to reduce the presence of $NO_x$ therein, said method comprising:

reforming a hydrocarbon compound to obtain a reductant gas having a higher reactivity than said hydrocarbon compound.

injecting the reductant gas into the gas stream;

delivering the gas stream injected with said reductant gas to a first catalyst having a first optimal processing temperature range for catalytically processing the gas stream; and conveying the gas stream from the first catalyst to a second catalyst, wherein said second catalyst has a lower second optimal processing temperature range relative to the first optimal processing temperature range for catalytically processing the gas stream subsequent to the first catalyst.

BRIEF DESCRIPTION OF THE DRAWINGS

Various embodiments of the disclosure are described in detail below with reference to the drawings, in which like items are identified by the same reference designation, wherein.

DETAILED DESCRIPTION OF THE DISCLOSURE

The present disclosure is directed to method and apparatus for catalytically processing a gas stream to remove or at least substantially reduce $NO_x$ compounds therefrom. The apparatus and method of the present disclosure provides an efficient means for reducing or eliminating $NO_x$ compounds in exhaust gases produced from an internal combustion engine. The apparatus and method of the present disclosure is designed to promote the catalytic conversion of $NO_x$ compounds present in the exhaust gases into environmentally compatible products. The apparatus of the present disclosure has been observed to yield a synergistic effect utilizing a combination of first and second catalysts in the presence of a reductant generally in the form of a hydrocarbon, injected into the exhaust gases upstream of the catalysts while using minimal packaging space. It has also been discovered that the presence of $H_2$ with the reductant improves low temperature NOx conversion. It has been further discovered that the $H_2$ enhancement of lean NOx can be achieved using a higher hydrocarbon than propane (hydrocarbon with a larger number of carbon atoms or longer chain hydrocarbon) over a staged catalyst comprising a Ag-alumina/Copper-ZSM-5 system. It has been determined that H2 is not effective over Cu-ZSM-5 in activating the hydrocarbon. It is believed that the $H_2$ increases the activity of the reductant. It is envisioned that the apparatus disclosed herein is suitable for use in lean $NO_x$ exhaust aftertreatment systems.

The present disclosure is designed to promote a synergistic effect from the combination of different catalysts by tailoring the intermediate reactant species, producing ammonia, amines, nitrites and other organo-nitrogen species. Compared to the prior art, the present disclosure is capable of generating higher NOx reduction performance with improved low temperature performance, while maintaining the same packaging volume and space velocity.

Figure 1:
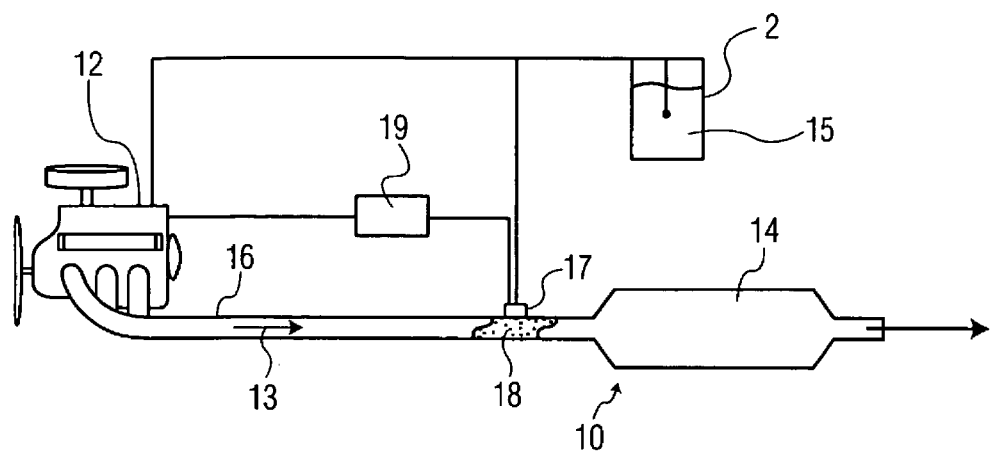
FIG. 1 is a schematic diagram illustrating the application of an apparatus for catalytically processing a gas stream to remove or at least substantially reduce $NO_x$ compounds therefrom, and adapted for use with a diesel engine in accordance with one embodiment of the present disclosure.

Referring to FIG. 1, a schematic diagram showing an apparatus of the present disclosure identified by reference numeral 10 coupled to a "lean burn" engine 12 in the form of a diesel engine. As used herein, a "lean burn engine" is defined as one that produces an oxygen-rich exhaust, which is defined as an exhaust having a higher molar ratio of oxygen than the total molar ratio of reductive compounds such as CO, hydrogen and hydrocarbons. The exhausts have an oxidative environment. Examples of such engine systems include diesel engine systems, spark ignited natural gas or alternative fuel engine systems, liquid or gaseous-fueled turbine engines, and various lean burn gasoline engine systems. Generally, diesel engine systems, as shown in FIG. 1 generate an exhaust having an oxygen content of from 4% to 16% depending on the load conditions and the running mode of the diesel engine.

An oxygen rich exhaust 13 exits engine 12 and is directed to the apparatus 10. Preferably, this exhaust is supplemented by the addition of a reductant in the form of an atomized hydrocarbon or mixture of hydrocarbons 18. In the illustrated embodiment, one source of these hydrocarbons can be the diesel fuel 15 in a tank 2 used as the primary source of fuel for the diesel engine 12. The hydrocarbon reductants can be the residual hydrocarbons remaining in the exhaust after the combustion event during an engine cycle. Alternatively, the supplemental hydrocarbons can be introduced as a post injection event, preferably during the power stroke or exhaust stoke of a four-stroke diesel engine. Yet another alternative, as illustrated, is to introduce the supplemental hydrocarbon in the exhaust system at a location downstream of the engine cylinders using an auxiliary injector 17 controlled by the engine control module (ECM) 19. It is also well known to use hydrocarbons other than the primary diesel fuel.

The engine exhaust is directed to the apparatus 10 comprising a catalytic unit 14. Deposited within the catalytic unit 14 is a combination of metal containing catalysts having the customized physical and chemical characteristics disclosed herein, that yield both high $NO_x$ removing performance, as well as other advantageous lean $NO_x$ catalyst performance characteristics. The composition of the combination of metal containing catalysts as well as the catalytic reactions is described in greater detail below.

Figure 2:
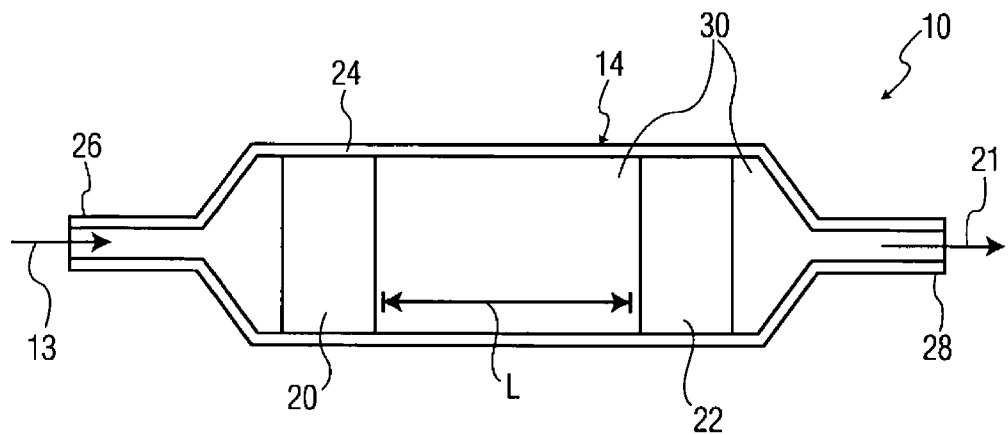
FIG. 2 is a longitudinal cross sectional view of an apparatus for catalytically processing a gas stream to remove or at least substantially reduce $NO_x$ compounds therefrom in accordance with one embodiment of the present disclosure.

Referring to FIG. 2, the apparatus 10 includes a catalytic unit 14 which is placed downstream from the lean burn engine 12 along the outgoing exhaust pipe 16. The exhaust 13 in the form of a gas stream (represented by an arrow) from the engine 12 is conducted along the exhaust pipe 16 in the direction indicated by the associated arrow in FIG. 2. For one embodiment of the present disclosure, the apparatus 10 includes an airtight housing 24 defining a packaging volume 30 occupied by the catalytic unit 14, an inlet port 26 at one end, and a outlet port 28 at the opposed end thereof. The packaging volume 30 is in fluid communication between the inlet and outlet ports 26 and 28, respectively. The inlet port 26 supplies the exhaust 13 from the combustion engine, and the outlet port 28 discharging an outgoing, purified exhaust gas stream 21.

The catalytic unit 14 of the apparatus 10 includes a first catalyst 20 having a first optimal processing temperature range for catalytically processing the gas stream of the exhaust 13, and a second catalyst 22 located downstream from the first catalyst 20. The second catalyst 22 exhibits a second lower optimal processing temperature range relative to the first temperature range for catalytically processing the gas stream subsequent to the first catalyst 20. In particular, the first catalyst 20 is adapted to facilitate the reaction of NOx with hydrocarbons to yield nitrogen-containing intermediates such as amines, ammonia, organo-nitrogen species and oxygenates. These intermediate species desorb into the gas phase along with activated NOx species. The second catalyst 22 is adapted to facilitate the reaction of these intermediates for further reduction into $N_2$. The inventors believe the first catalyst not only converts some of the NOx directly to N2, but also produces intermediate species from the remaining NOx that further react to form N2 over the second catalyst.

In a preferred embodiment of the present disclosure, the first catalyst 20 is composed of a catalytically active metal-containing alumina ($Al_2O_3$) material, preferably a metal-containing γ-alumina material, and the second catalyst 22 is composed of a catalytically active metal-containing zeolite material, preferably a metal-containing ZSM-5 material. The first and second catalysts 20 and 22 are generally structurally arranged into catalyst beds which may be in the form of powders, pellets, particles, washcoated or formed monoliths such as a honeycomb structure, and the like.

The metal of the first catalyst 20 is preferably selected from silver, indium, gallium, tin, cobalt, and mixtures thereof, and more preferably from silver. The loading of the metal of the first catalyst 20 is preferably from about 1 to 15 wt % based on the total weight of the first catalyst, and more preferably from about 2 to 5 wt %. In a preferred embodiment of the present disclosure, the first catalyst 20 is composed of silver-containing alumina catalyst (Ag/alumina).

It has been found that alumina formed by a sol-gel method produces a material having unique properties for utilization in lean $NO_x$ catalytic treatment of oxygen rich exhaust. Various methods of forming the alumina component were investigated. In one embodiment, γ-alumina was prepared by a complexing agent-assisted, sol-gel method. Another embodiment had the γ-alumina support material prepared by a precipitation method without the use of a complexing agent.

The alumina component of the first catalyst 20 is preferably synthesized via sol gel methods using a complexing agent in combination with a washing step employing an alcohol, such as, for example, 2-propanol. The sol gel method is advantageous in that the resulting product is characterized by a basic pH, excellent hydrothermal stability, and optimized metal dispersion on the alumina component to maximize loading capacity and uniformity, thereby enhancing greater reduction of $NO_x$ compared to conventional preparation methods. Specific details on the sol-gel process can be found in Example 2 hereinafter. Further details on the synthesis of alumina via the sol-gel process can be found in U.S. Pat. Nos. 6,703,343 and 6,706,660, the teachings of which are incorporated herein by reference to the extent they do not conflict herewith.

The metal doping or loading of the alumina material is preferably accomplished in one of two ways. In one method, the subject metal dopant is solubilized in the water that is used to stop gelation during the sol-gel procedure described above.

In a second method, the calcined sol-gel γ-alumina is doped with a metal by an incipient wetness impregnation method. In the preferred incipient wetness impregnation method, the calcined powder sol-gel prepared γ-alumina is brought into contact with a solution of the appropriate metal. The solution of the metal is present in an amount equal to or greater than the total pore volume of the γ-alumina sample. The pore volume of γ-alumina prepared is preferably between about 0.5 and about 2.0 cc/g of alumina.

To form an indium or indium oxide doped γ-alumina by the incipient wetness method an appropriate amount of $In(NO_3)_3$ (or $InCl_3$) is dissolved in a water solution and brought into contact with the sol-gel γ-alumina. The indium or indium oxide doped γ-alumina catalyst is then calcined at 600° C. for about 5 hours.

Tin or tin oxide doped γ-alumina is prepared in the same manner using $SnCl_3$ in an ethanol solution instead of water. The tin or tin oxide doped γ-alumina catalyst is calcined at 600° C. for about 5 hours and then at 800° C. for about 2 hours.

A third promising metal promoter evaluated is gallium or gallium oxide. A gallium or gallium oxide doped γ-alumina is prepared by exposing the γ-alumina to a water solution of $Ga(NO_3)_3$—$H_2O$ which is added to the aluminum oxide gel during the γ-alumina preparation in the sol-gel method. The gallium or gallium oxide doped γ-alumina catalyst is calcined at 600° C. for about 5 hours to form oxides of gallium-loaded alumina.

The metal of the second catalyst 22 is preferably selected from copper, iron, cobalt, mixtures thereof, and more preferably from copper. The loading of the metal of the second catalyst 22 is preferably from about 2 to 15 wt % based on the total weight of the second catalyst, and more preferably from about 3 to 11.5 wt %. In a preferred embodiment of the present disclosure, the second catalyst 22 is composed of a copper containing zeolite catalyst (Cu/zeolite). The zeolite component may be selected from any suitable zeolite including, but not limited to, ZSM-5, ZSM-11, ZSM-35, MCM-22, MCM-49, Beta, MCM-56, ITQ-13, and MCM-68. A preferred zeolite is ZSM-5. Further details on metal doping or loading the ZSM-5 component can be found in Example 1 hereinafter.

The first and second catalysts 20 and 22 of the catalytic unit 14 are enclosed within the packaging volume 20 of the housing 24 with the first catalyst 20 positioned upstream from the second catalyst 22. The first and second catalysts are present in an amount ratio ranging from about 1:2 to 2:1, with a ratio of about 1:1 being preferred. In this embodiment, the first and second catalysts 20 and 22 are arranged in juxtaposition to one another. Alternatively, the first and second catalysts 20 and 22 are maintained spaced apart at some distance L, from one another. Typically, performance increases with residence time. The first catalyst 20 in combination with the second catalyst 22 function to convert and reduce the presence of $NO_x$ in the gas stream of the exhaust 13 entering through the inlet port 26 and exiting out of the outlet port 28 of the apparatus 10 in a more purified form.

As discussed above, the exhaust 13 can be injected with a reductant before the catalytic unit 14 to enhance the catalytic reaction associated with converting $NO_x$ to $N_2$. The reductant can be tapped off the fuel tank 15 associated with the combustion engine 12 and injected into the exhaust 13 via a fuel injector or other suitable means. Other examples of suitable reductants in association with a diesel engine include dodecane, ethanol, propane, diesel fuel, kerosene, diesel-range paraffins, diesel-range non-aromatic streams, and the like. Other examples of suitable reductants in association with a gasoline engine include gasoline, propane, ethanol, octane, and the like.

Example 1

A sample of copper containing ZSM-5 zeolite catalyst was produced by preparing a solution containing 68 grams of copper (II) nitrate hydrate and 1000 ml of deionized water. Thereafter, 200 grams of ZSM-5 zeolite crystal were added while the solution was stirred. The resulting mixture was stirred for about 1.5 hours and then the pH was adjusted to 7.25 by the addition of 35.7 grams of $NH_4OH$. The stirring of the mixture continued for about 1 hour. The zeolite mixture was filtered, and washed with 1000 ml of deionized water. The filtrate was dried overnight at about 85° C. The exchanged zeolite was then air calcined by ramping the temperature at a rate of 2° C./min to 550° C., holding for about 2 hours, and then cooled to room temperature. Copper analysis indicated the copper loading was about 11.5 wt. %.

A sample with 3 weight % copper loading was prepared using the above procedure by varying the amount of copper (II) nitrate hydrate.

Example 2

γ-Alumina support was prepared by utilizing a complexing agent-assisted sol gel method. 500 grams of aluminum isopropoxide (AIP) (98%+, Aldrich Chemical Company, Inc.) was dissolved in 600 ml of 2-methyl-2,4-pentanediol (MPD) (99% Aldrich Chemical Company, Inc) in a beaker. The resulting mixture was stirred vigorously with a mechanical polyethylene stirrer. Once the mixture was mixed homogenously, the beaker was placed in a constant temperature bath at a temperature of about 120° C. and stirred continuously for about an hour. Once all the AIP was dissolved, a clear yellowish green solution was obtained. The AIP reacts with MPD to yield 2-propanol in the form of a vapor at the 120° C. reaction condition and the solution begins to gel. Once the gelation is completed after 4 hours, 400 ml of water was added to terminate the gelation and yield a white precipitate (aluminum hydroxide). The white solid product was redispersed in water and aged at 90° C. overnight under constant stirring.

After aging overnight, 600 ml of 2-propanol was added to remove the water from the pores of the precipitate. Although 2-propanol or methanol is preferred, any organic solvent having a surface tension of about equal to or less than 30 mN/m will be useful. It is just necessary that the solvent have a surface tension significantly below that of water, which is about 72 mN/m. The slurry was vacuum filtered and dried at 90° C. in an oven for about 48 hours.

Calcination was carried out in a temperature programmed tube furnace with 5 L/min air flowing through it. A general calcination schedule is as follows: ramp the temperature from 100° C. to 700° C. at about 1° C./min; maintain at 700° C. for a prescribed time, and turn off the heat and continue air over the alumina until the temperature is reduced to 100° C. During calcination, a selected amount of water (e.g., 2% to 6% or more) can be added to partially sinter the powders.

This procedure can be controlled so as to yield γ-alumina with pre-aging surface areas greater than about 200 $m^2/g$, pre-aging pore volumes of from about 1.0 to 2.0 cc/g and pre-aging pore sizes averaging from about 4 to 20 nm. The resulting alumina product had a surface area of from about 200 to 230 $m^2/g$.

Example 3

Several samples of silver-containing γ-alumina catalysts were prepared via the incipient wetness impregnation technique. Aqueous silver nitrate or silver sulfate solution was added drop-wise and mixed with the γ-alumina product of Example 2. The volume of the nitrate solution was calculated to substantially match the pore volume of the γ-alumina product, which was about 1.4 ml per gram of γ-alumina. Thus, 0.322 grams of silver nitrate was dissolved in 14 ml of water and mixed with 10.0 grams of alumina. The impregnated sample was then manually mixed with a spatula, dried overnight at 90-110° C., and calcined for about 5 hours at 600° C. in the presence of air. In another preparation, 0.2966 grams of silver sulfate was dissolved in 42 ml of water because of lower solubility, and this was added in three steps using 14 ml each time with drying and calcination between the steps. The silver loading in the catalyst was 2 weight % based on the total weight of the catalyst.

Example 4

Two catalysts were prepared by dissolving 500 g aluminum isopropoxide (AIP) in 600 ml 2-methyl-2,4-pentanediol (MPD) using the sol-gel procedure described in Example 2. In this example, however, as part of the preparation, 4.025 g Ag(NO3) or 3.7075 g Ag2(SO4) was dissolved in 600 mL propanol and added to the slurry during the propanol washing step of Example 2. The slurry was mixed for about an hour and the resulting products were vacuum filtered to yield the catalysts.

Example 5

Catalyst evaluation experiments were conducted in a quartz reactor heated in an electric furnace. A gas mixture was passed over a catalyst bed supported in the quartz reactor. The gas mixture contained 1000 ppm NO (nitric oxide), 1000 ppm propylene as a reductant, and 9% oxygen with the remaining portion composed of helium. The total flow rate of the gas was about 1500 ml/minute, and the catalyst volume was about 3.0 ml to yield a gas hourly space velocity (GHSV) of 30,000. The temperature of the catalyst was increased from 150° C. to 550° C. and then reduced back to 150° C. Data were recorded as the temperature was reduced. In one evaluation, 1.5 ml of Ag/alumina catalyst was placed upstream of 1.5 ml of Cu/ZSM-5 catalyst. In the second and third evaluations, the catalysts were evaluated individually. The copper loading was about 11.5 wt % based on the total weight of the copper containing catalyst. The alumina catalyst contained 2 wt % silver.

Figure 3:
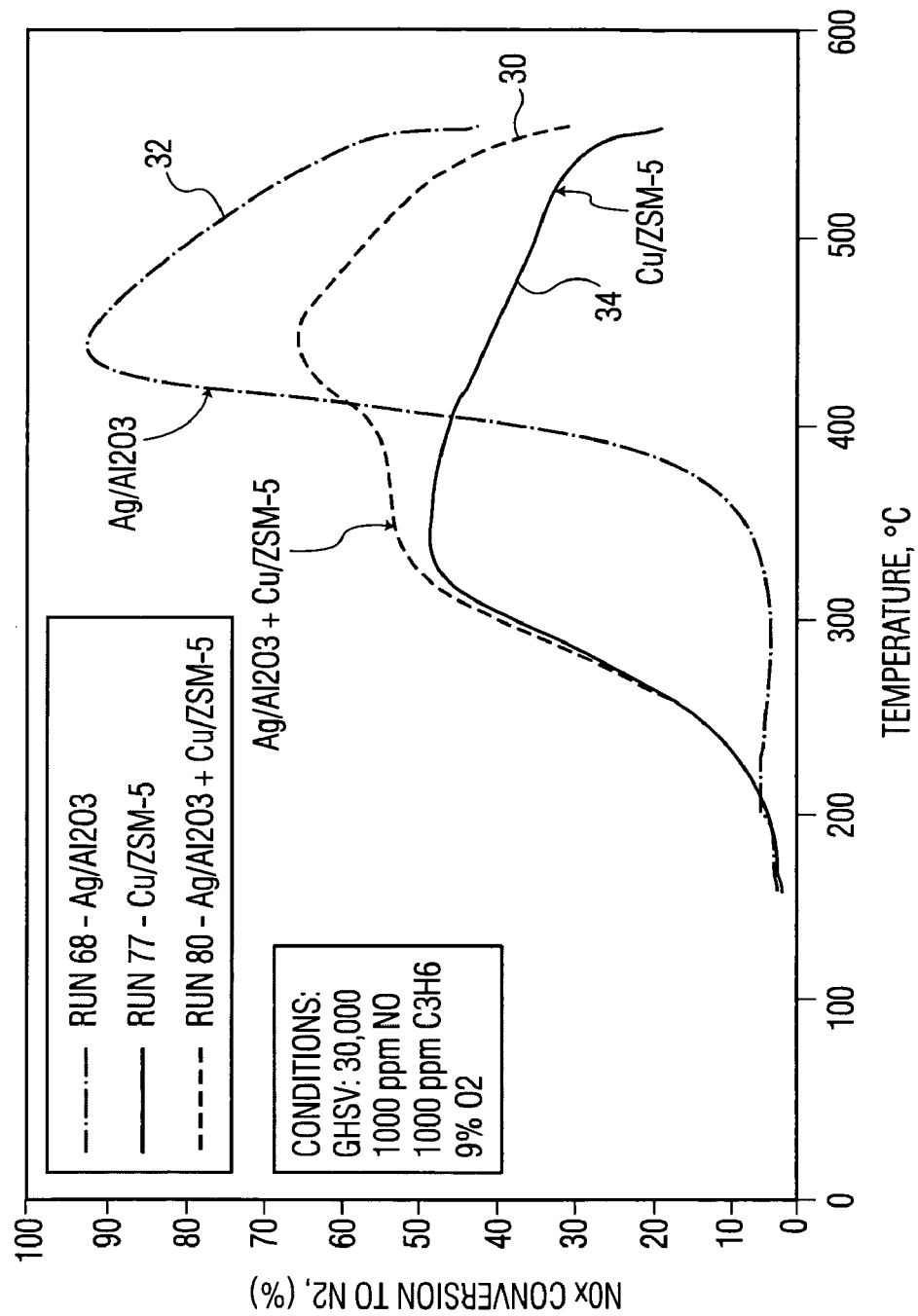
FIG. 3 is a graph comparing the performance of the combination of Ag/Alumina and Cu/ZSM-5 catalysts to the performances of the catalysts individually in accordance with the present disclosure in the absence of water.

As shown in the graph of FIG. 3, the results of the evaluations compare the performance of the combination of catalysts to the performances of the catalysts individually. The graph shows that the combination of catalysts as represented by curve 30 exhibited a broader temperature window of activity in removing $NO_x$ when compared to the individual catalysts as represented by curves 32 and 34, respectively.

Example 6

A catalyst evaluation experiment was conducted in a quartz reactor heated in an electric furnace in accordance to the procedures described in Example 5 except the gas mixture passing over the catalyst bed included 7% water. Further evaluations were made to compare the effects of copper loading at about 3 wt % and about 11.5 wt %, respectively, based on the total weight of the copper containing catalyst.

Figure 4:
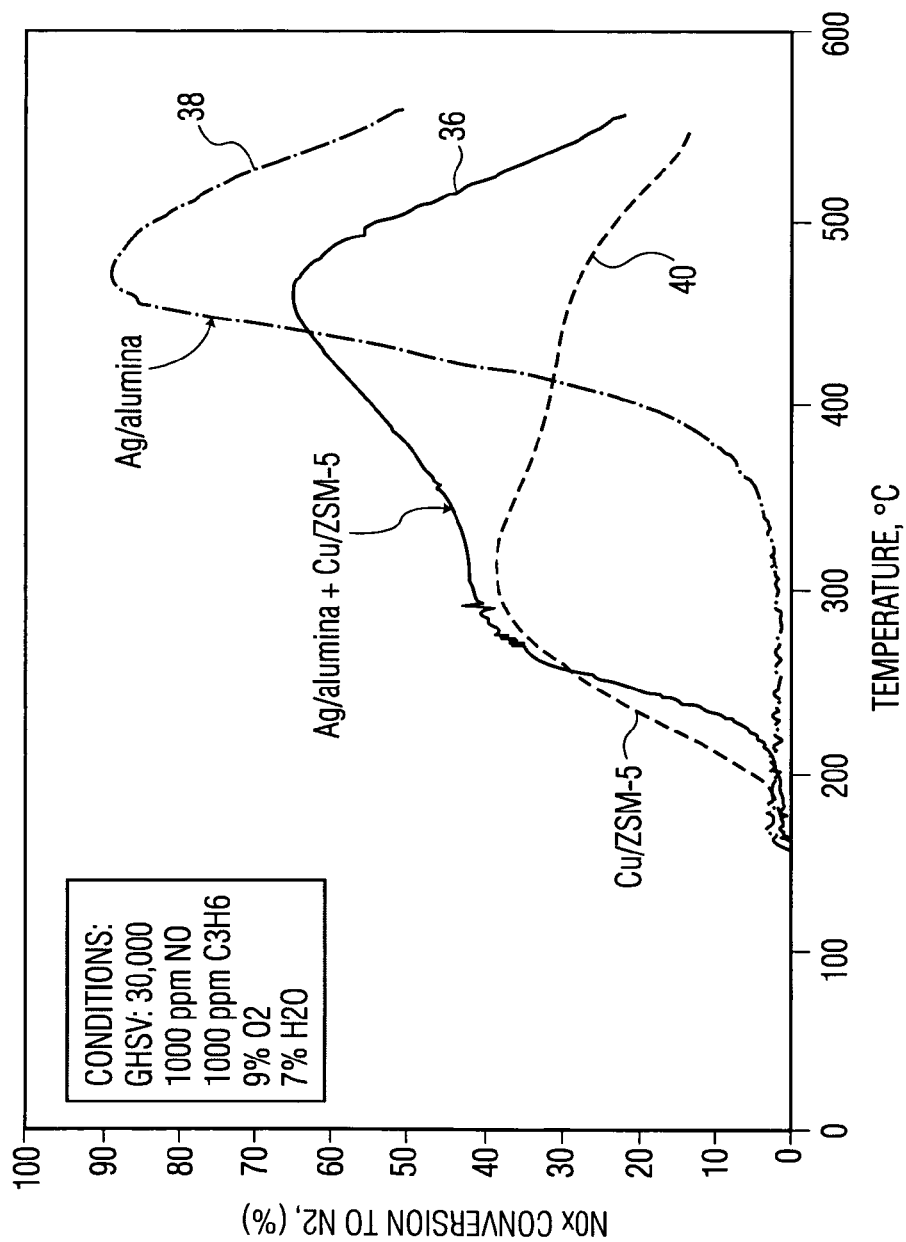
FIG. 4 is a graph comparing the performance of the combination of Ag/Alumina and Cu/ZSM-5 catalysts to the performances of the catalysts individually in accordance with the present disclosure in the presence of water.

As shown in the graph of FIG. 4, the results of the evaluations compare the performance of the combination of catalysts to the performances of the catalysts individually. The graph shows that the combination of catalysts as represented by curve 36 maintains a broader temperature window of catalytic activity in removing $NO_x$ even in the presence of water than the individual catalysts as represented by curves 38 and 40, respectively.

Figure 5:
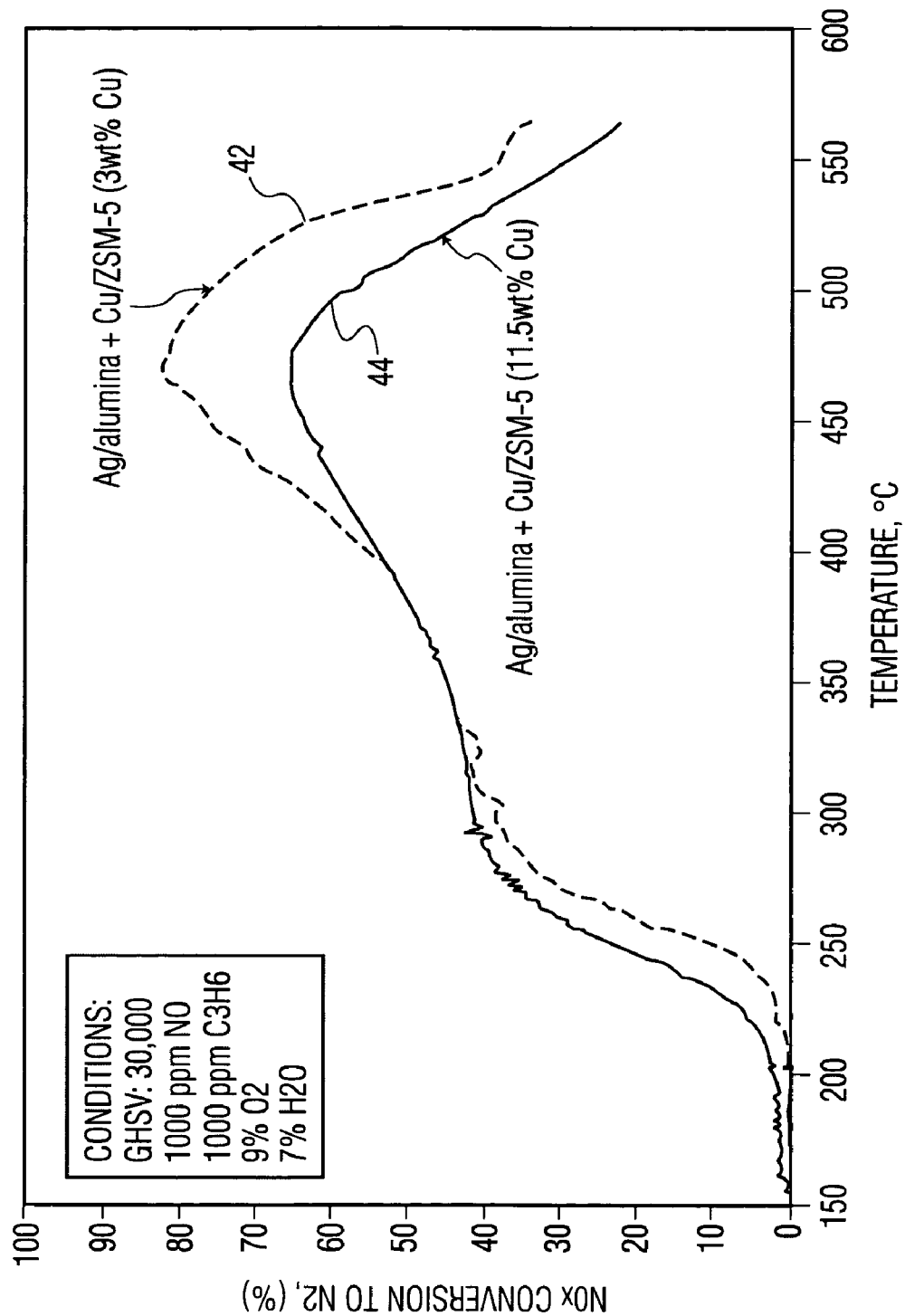
FIG. 5 is a graph comparing the performances of the combination of Ag/Alumina and Cu/ZSM-5 catalysts at different copper loadings in accordance with the present disclosure.

As further shown in FIG. 5, catalytic activity at the higher end of the temperature range was observed to be improved with lower Cu loading at about 3 wt % represented by curve 42 as compared to the Cu loading of about 11.5 wt. % based on the total weight of the copper containing catalyst represented by curve 44.

Example 7

The Ag/alumina and Cu/ZSM-5 catalysts were each wash coated onto a 1" diameter by 3" long monolith and evaluated with dodecane (a diesel range molecule) as a reductant. The evaluations were carried out in a stainless steel reactor. The reactor was an inline serpentine electrical gas heater heating the inert gases. A gas mixture was passed over a catalyst bed supported in the quartz reactor. The gas mixture contained 500 ppm NO (nitric oxide), 3000 ppm (as a C1) dodecane as a reductant, 50 ppm propene, 500 ppm CO (carbon monoxide), 8% carbon dioxide, 7% water, and 9% oxygen with the remaining portion composed of nitrogen. The gas hourly space velocity (GHSV) was adjusted to 35,000 $h^{-1}$ for all tests. The temperature of the catalyst was increased from 150° C. to 550° C. and then reduced back to 150° C. Data were recorded as the temperature was reduced. In one evaluation, the Ag/alumina catalyst was placed upstream of the Cu/ZSM-5 catalyst. In the second and third evaluations, the catalysts were evaluated individually.

Figure 6:
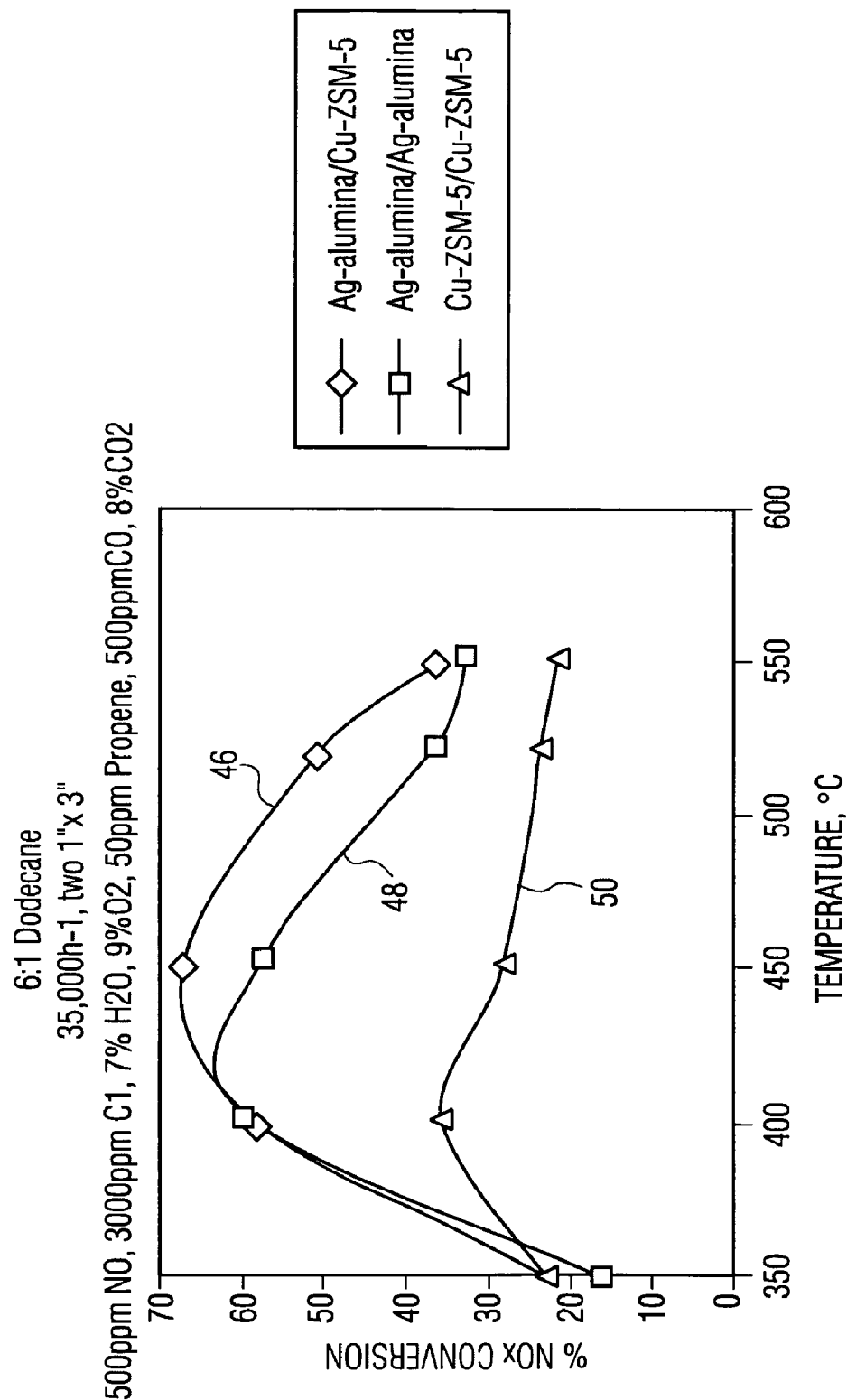
FIG. 6 is a graph comparing the performance of the combination of Ag/Alumina and Cu/ZSM-5 catalysts to the performances of the catalysts individually in the presence of a dodecane reductant in accordance with the present disclosure.

As shown in the graph of FIG. 6, the results of the evaluations compare the performance of the combination of catalysts to the performances of the catalysts individually. The performance of the combination of catalysts as represented by curve 46 was observed to be better than the additive performance of the individual catalysts as represented by curves 48 and 50, respectively.

Example 8

A set of ZSM-5 powders of varying crystal sizes and silica/alumina ratios were exposed to steam at a concentration of 10% water vapor for about 16 hours at 600° C. to simulate aging induced by engine exhaust. The powders were subsequently pelleted and tested or evaluated for $NO_x$ conversion. A second set of catalysts was prepared from same starting powders except the catalysts were impregnated with iron prior to being exposed to the steam. The second set of iron containing catalysts was prepared by adding 5.4 grams of iron (III) nitrate nonahydrate to 40 grams of deionized water under constant stirring. The resulting solution was added drop-wise to mix with 30 grams of ZSM-5. The impregnated powder was then dried overnight at about 85° C. The iron-containing ZSM-5 catalyst was air calcined at about 400° C. for about 3 hours. The resulting catalysts contained 2.5 wt % iron.

The catalysts were evaluated using a quartz reactor heated in an electric furnace. A gas mixture containing 1000 ppm NO (nitric oxide), 1000 ppm propylene, 9% oxygen and the remaining portion being helium, was passed over the catalyst bed supported in the quartz reactor. The total flow rate of the gas mixture was about 1500 ml/min, and the catalyst volume was maintained at about 3.0 ml to yield a gas hourly space velocity (GHSV) of about 30,000. The temperature of the catalyst was increased from 150° C. to 550° C. and then reduced to 150° C. Data was recorded during the temperature reduction. The results are summarized in Table 1 below.

TABLE 1

| | | Maximum $NO_x$ conversion, % | |
|---|---|---|---|
| Crystal size, µm | $SiO_2/Al_2O_3$ | H-ZSM-5 | Fe-ZSM-5 |
| 0.02-0.05 | 60 | 8 | 10 |
| 0.5-2.0 | 50 | 14 | 17 |
| 0.5-2.0 | 25 | 8 | 10 |
| 5-8 | 80 | 8 | 8 |

The data shows that an optimized catalyst is generally obtained at an intermediate crystal size (0.5-2.0 µm) and intermediate $SiO_2/Al_2O_3$ (50). Although the metal in the metal-containing zeolite (ZSM-5) was iron, Applicants anticipate similar results for other related metals including copper.

Example 9

Figure 7:
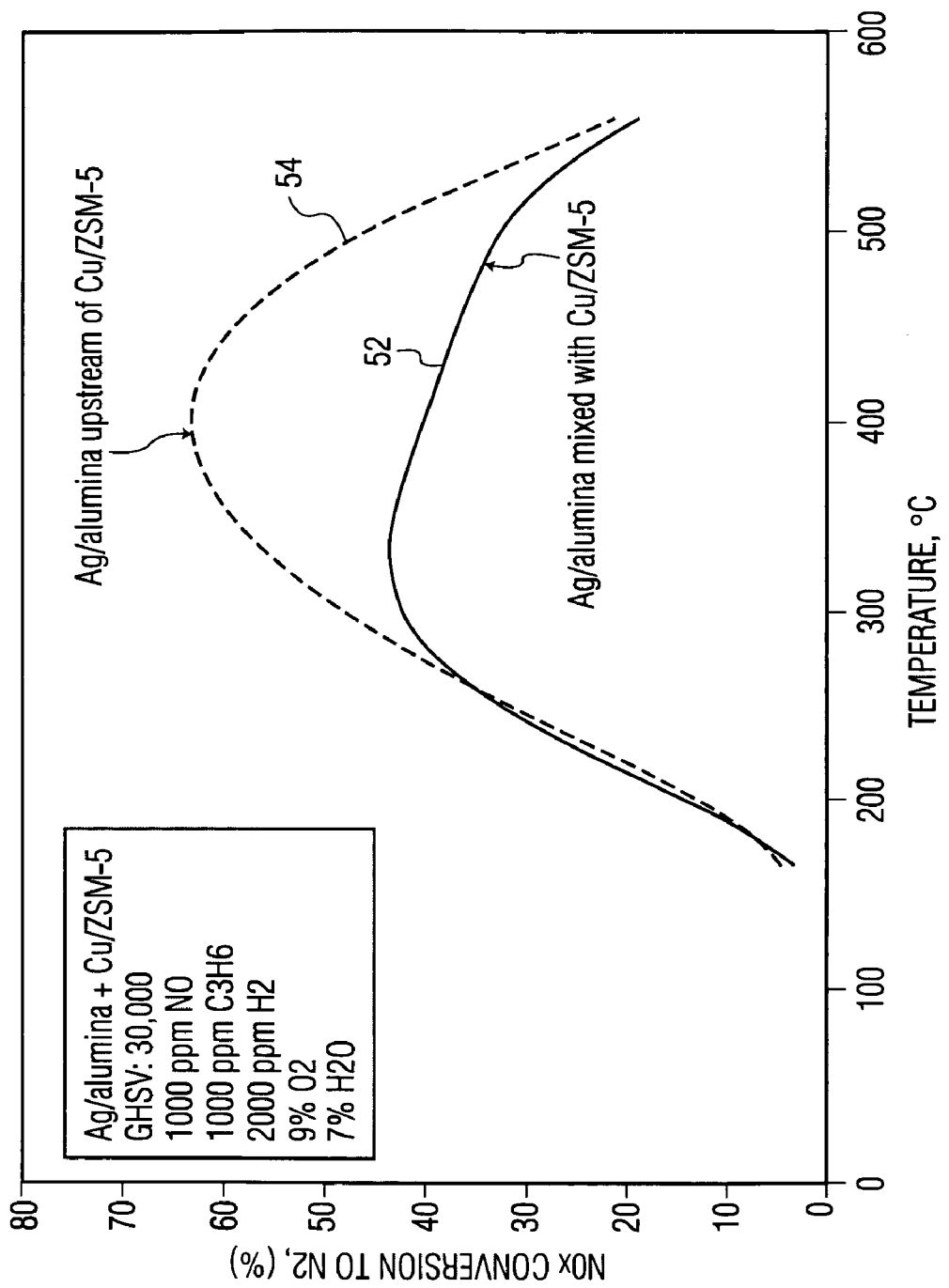
FIG. 7 is a graph comparing the performance of the combination of Ag/Alumina and Cu/ZSM-5 catalysts in different physical arrangements in accordance with the present disclosure.

An evaluation was implemented which tested a combination catalyst consisting of Ag/alumina and Cu/ZSM-5 located downstream therefrom, and a combination catalyst consisting of Ag/alumina intermixed with Cu/ZSM-5. The catalysts were evaluated using a quartz reactor heated in an electric furnace. A gas mixture containing 1000 ppm NO (nitric oxide), 1000 ppm propylene, 2000 ppm hydrogen, 9% oxygen and the remaining portion being helium, was passed over the catalyst bed supported in the quartz reactor. The total flow rate of the gas mixture was about 1500 ml/min, and the catalyst volume was maintained at about 3.0 ml to yield a gas hourly space velocity (GHSV) of about 30,000 $hr^{-1}$. The temperature of the catalyst was increased from 150° C. to 550° C. and then reduced to 150° C. Data was recorded during the temperature reduction. The results are shown in FIG. 7.

The results indicate that a mixed combination catalyst as represented by curve 52 operates less effectively than a staged catalyst having Ag/alumina upstream of Cu/ZSM-5 as represented by curve 54. The peak $NO_x$ conversion to $N_2$ was about 63% for the staged catalyst while the mixed catalyst had a peak $NO_x$ conversion to $N_2$ of about 43%.

Example 10

Figure 8:
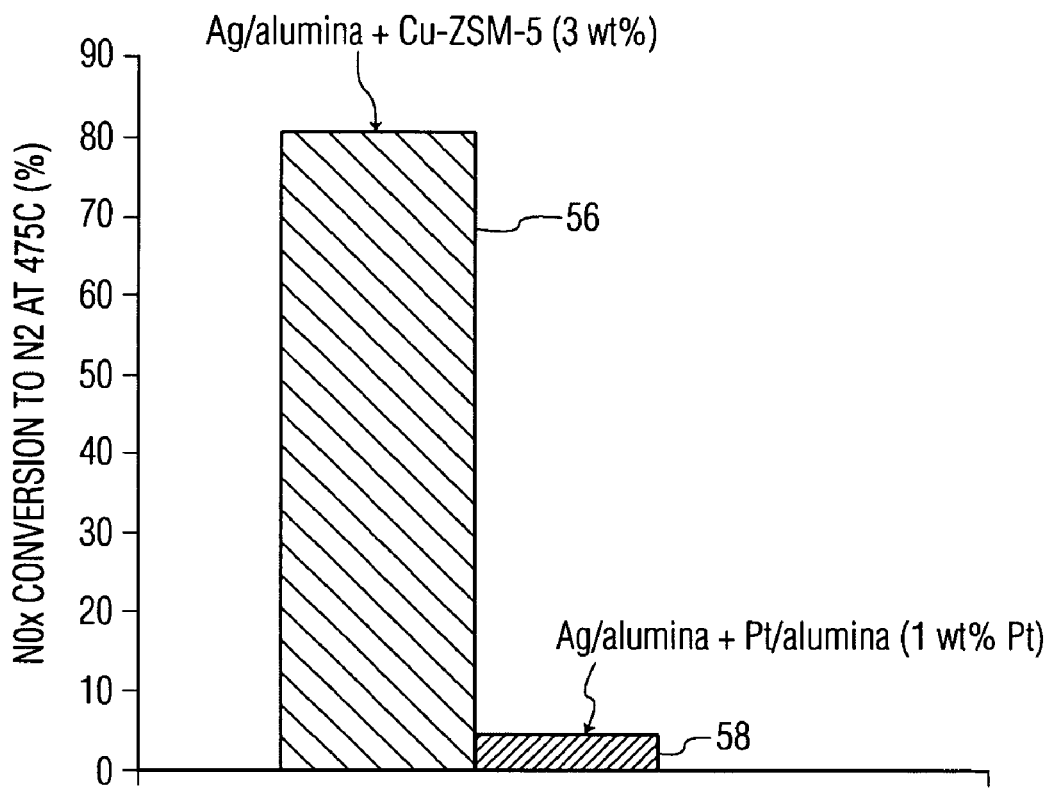
FIG. 8 is a graph comparing the performance of the combination of Ag/Alumina and Cu/ZSM-5 catalysts to the performance of the combination of Ag/Alumina and Pt/Alumina catalysts in accordance with the present disclosure.

A catalyst evaluation experiment was conducted in a quartz reactor heated in an electric furnace in accordance to the procedures described in Example 5 except the gas mixture passing over the catalyst bed included 7% water. The NOx removing activity was measured at 475° C. using the combination of Ag/alumina and downstream Cu/ZSM-5 catalysts with 3 wt % Cu loading, and the combination of Ag/alumina and downstream Pt/alumina with 1 wt % Pt loading. The results of the evaluation are shown in FIG. 8. The combination of Ag/alumina and downstream Cu/ZSM-5 catalysts exhibited 80% $NO_x$ conversion to $N_2$ as represented by bar 56, while the combination of Ag/alumina and downstream Pt/alumina exhibited 4% $NO_x$ conversion to $N_2$ as represented by bar 58.

Applicants believe that the initial reaction of $NO_x$ with hydrocarbons on Ag/alumina catalysts results in the formation of intermediate species such as ammonia, amine, organonitrogen species, and oxygenates. These intermediates desorb into the gas phase together with activated $NO_x$ species. While some literature reports indicated that there is further homogenous gas reaction leading to $N_2$ formation, Applicants believe that over the staged catalyst system, the second catalyst (i.e., Cu-ZSM-5) utilizes these species preferentially and enhances the reduction to $N_2$. However, the same species are reacted on Pt/alumina and oxidized back to $NO_x$ which drastically reduced $NO_x$ conversion in conformation with previous literature results.

Example 11

Figure 9:
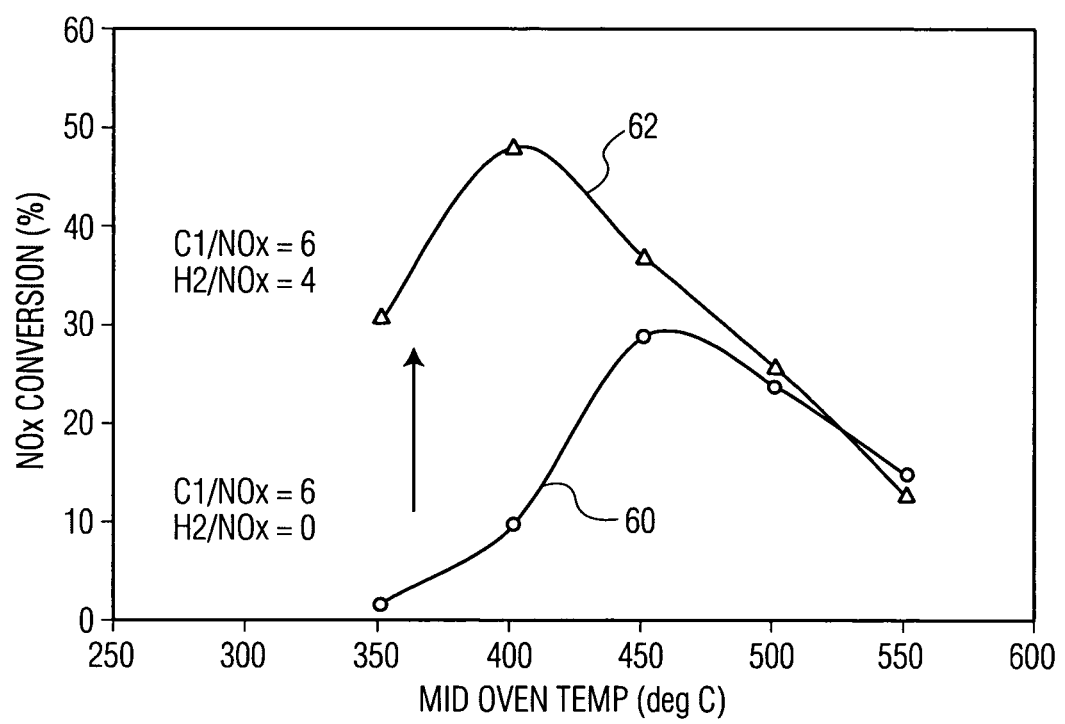
FIG. 9 is a graph comparing the performance of the combination of Ag/Alumina and Cu/ZSM-5 catalysts used with only octane added to the gas stream to the performance of these catalysts with H2 and octane added to the gas stream to improve lean $NO_x$ conversion.

Experiments conducted using the aforesaid combination catalysts of Ag/alumina and Cu/ZSM-5 proved that $H_2$ addition (at $H_2/NO_x=2$ and greater ratio) can improve $NO_x$ conversion even when n-octane is used as a reductant. The results are shown in FIG. 9, in which curve 60 shows the $NO_x$ conversion with an octane reductant, and curve 62 shows the improvement in $NO_x$ conversion using the octane reductant with $H_2$. For curve 62, $C1/NO_x=6$, and $H_2/NO_x=4$. For curve 60, $C1/NO_x=6$, and $H_2/NO_x=0$. With further reference to FIG. 9, note that these tests were carried out through use of an oven in which a simulated exhaust gas stream was passed through having a space velocity of 50,000 $h^{-1}$, containing 500 parts per million (ppm) of $NO_x$, 500 ppm CO, 8% $CO_2$, 9% $O_2$, 7% $H_2O$, with octane serving as the hydrocarbon.

Example 12

Figure 10:
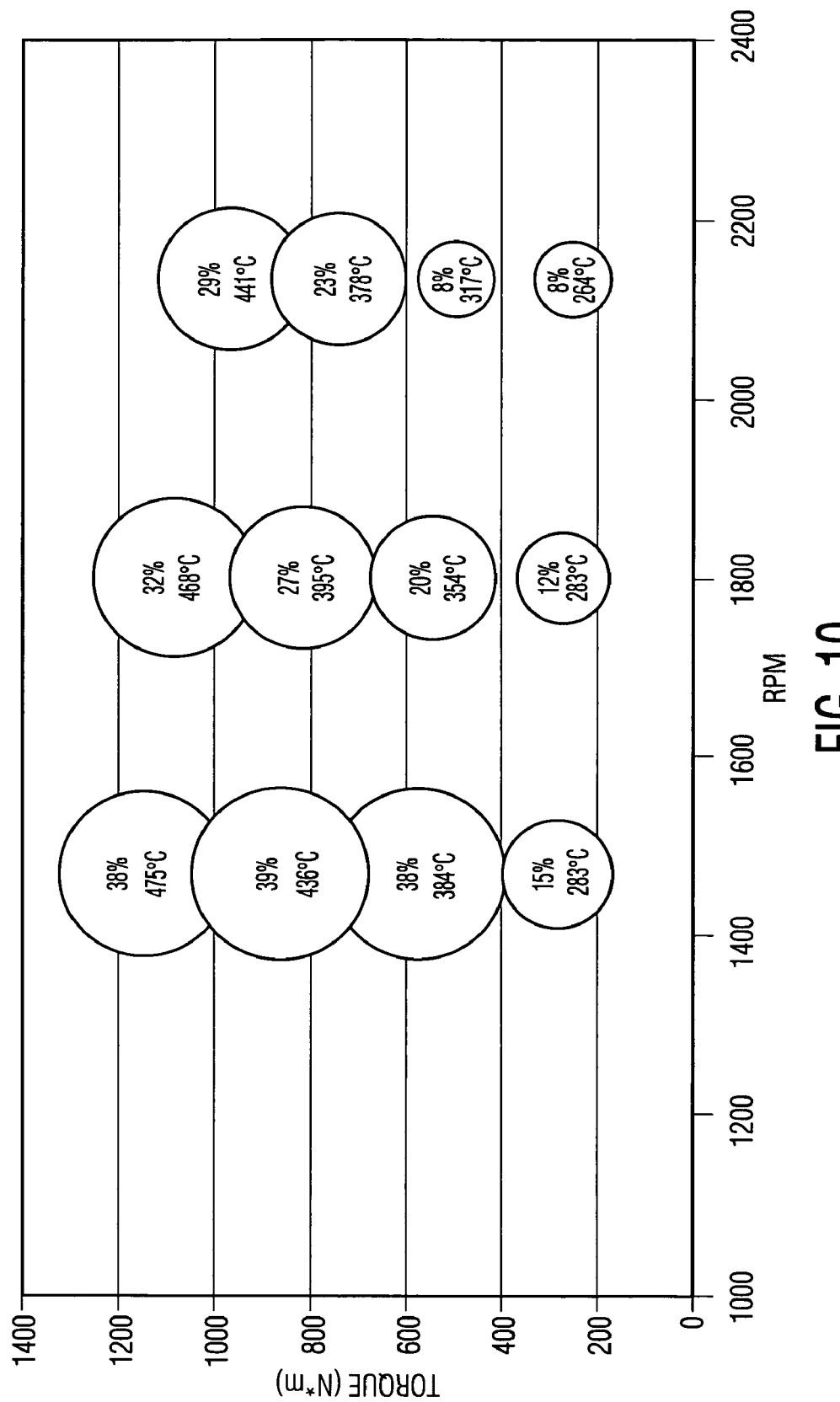
FIG. 10 is a bubble graph plotting torque versus rpm (revolutions per minute) for showing NOx conversion for typical lean NOx catalysts as tested on a Caterpillar® 3126E 4 g/bhp-hr NOx engine at different catalyst inlet temperatures and engine exhaust flow rate.

Experiments were conducted using a Caterpillar 3126E 7.2 L 4 g $NO_x$ 300 HP diesel engine to test the $NO_x$ conversion of a number of lean-$NO_x$ catalysts available from various suppliers. As shown in the bubble chart of FIG. 10, a 24% $NO_x$ reduction with a 5.7% fuel penalty was achieved based on a 12-mode ESC weighted average exclusive of the idle mode. Such performance is typical of presently available Lean-$NO_x$ catalysts. These experiments illustrate the catalyst limitations of present Lean-$NO_x$ technology, and the poor $NO_x$ conversion at low temperatures with a diesel fuel reductant. Note that the bubbles each include the percent $NO_x$ reduction imprinted within, and the associated exhaust gas stream temperature at the inlet to the associated catalyst.

From previous experiments, as discussed above, the inventors recognized that $NO_x$ conversion of lean $NO_x$ catalysts at lower temperatures can be significantly improved by using a reformer to provide $H_2$, in combination with diesel fuel reductant. As a result, particularly for $NO_x$ conversion associated with a diesel engine, the reformer assisted lean $NO_x$ system 64 of FIG. 11 was developed and tested with results as given below. The system includes a source of diesel fuel 66, a reformer 68 to convert diesel fuel to $H_2$, CO, or oxygenated hydrocarbon (it has been determined the CO has no effect in activating NOx reduction as does $H_2$ or oxygenated hydrocarbon for injection into the exhaust gas stream 74, a valve 70 for injecting diesel fuel reductant into the exhaust gas stream 74, the catalytic unit 14 including the first and second catalysts 20 and 22 described above, and a controller 76 for controlling the reformer 68 and valve 70 in response to the speed/torque and temperature of the diesel engine 78. In a prototype system, a Plasmatron of ArvinMeritor provided the reformer 68.

Example 13

Figure 11:
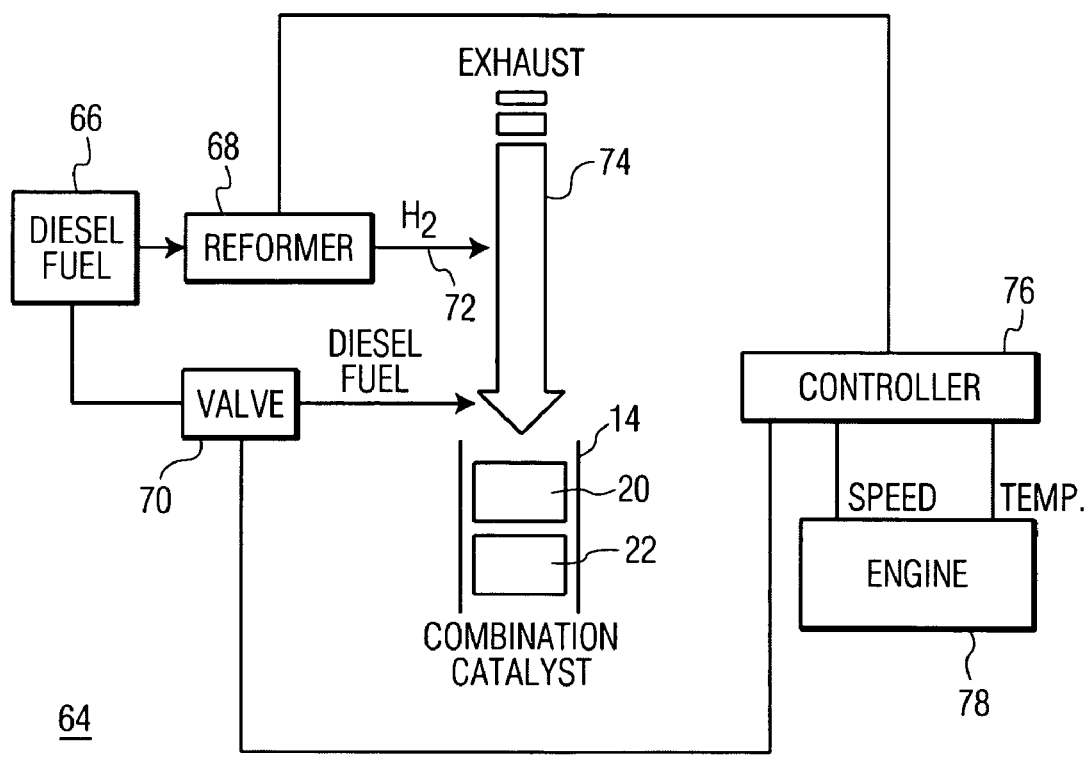
FIG. 11 is a block schematic diagram showing a simplified illustration of the present reformer assisted lean-NOx system.
Figure 12:
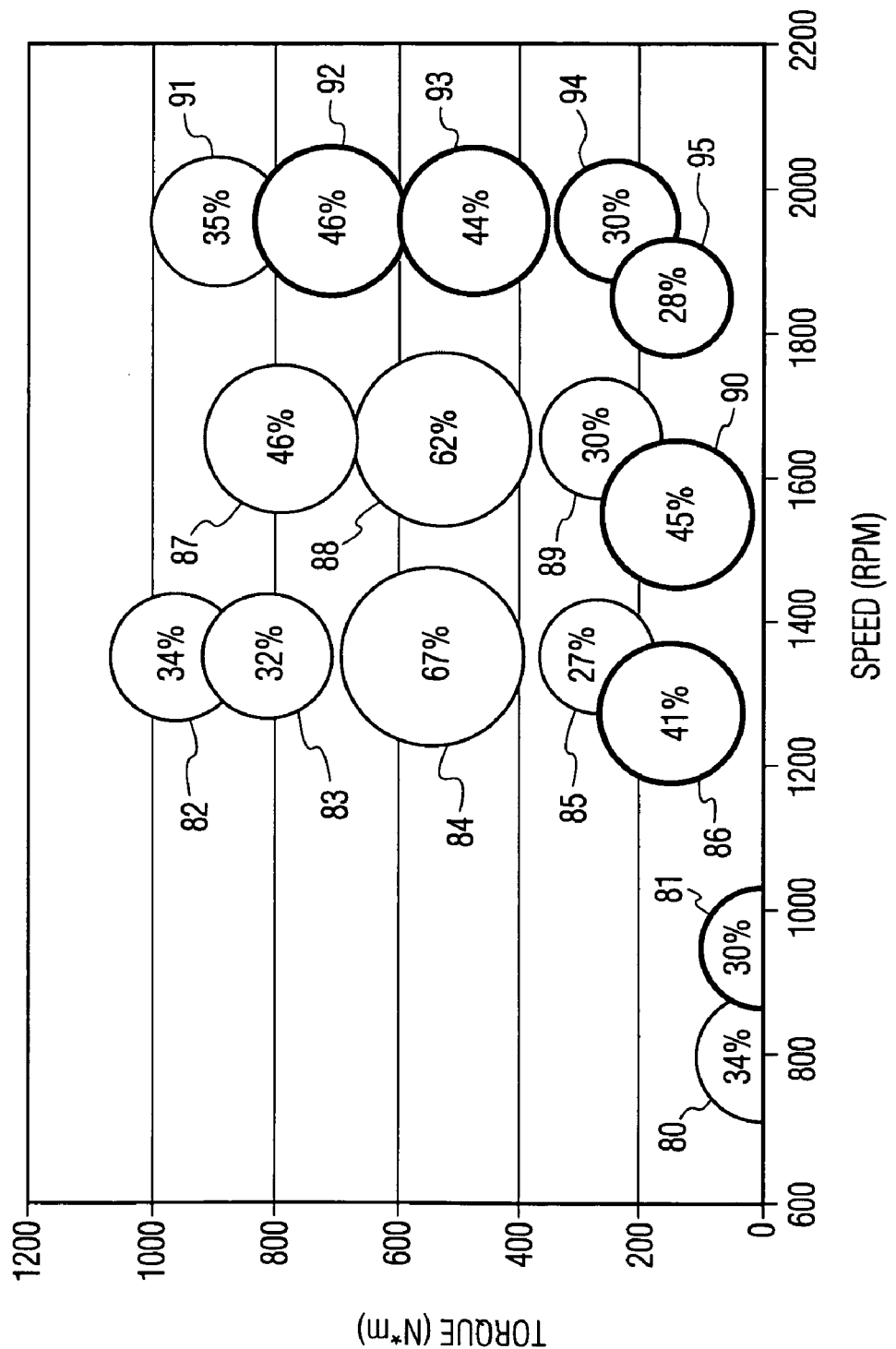
FIG. 12 is a bubble graph plotting torque versus speed for showing NOx conversion using the present combined catalysts with only a diesel fuel reductant compared with the use of a diesel fuel reductant and a reformer, as tested on a 4.5 g/bhp-hr NOx Cummins 8.3 L engine.

Using the system of FIG. 11, tests were conducted using a 4.5 g $NO_x$ Cummins 8.3 L diesel engine, an Ag/alumina catalyst 20, a Cu-Zeolite catalyst 22, and a diesel fuel reductant. The results of the test are shown in the bubble chart of FIG. 12 plotting torque against speed of the engine under test for showing $NO_x$ reduction over different modes of operation for differing exhaust gas temperatures in association with the torque speed of the engine, for comparing $NO_x$ conversion without injection of hydrogen ($H_2$), and with use of $H_2$ generated from a reformer, for example. Bubbles 80 through 95 show the test results. The combination catalyst 14 including catalyst 20 and 22, as shown in FIG. 11, was used in the test. The temperatures for the various test modes associated with the bubbles 80 through 95 are 109° C., 102° C., 595° C., 570° C., 500° C., 275° C., 290° C., 508° C., 437° C., 304° C., 294° C., 504° C., 472° C., 387° C., 297° C., and 286° C., respectively. The fuel penalty associated with each of the tests relative to bubbles 80 through 95 are 23.5%, 18.6%, 6.2%, 6.2%, 10.1%, 16%, 10.9%, 5.8%, 8.9%, 17.2%, 17.2%, 4.4%, 6.9%, 4.8%, 12.8%, and 7.4%, respectively. The percent $NO_x$ reduction obtained with use of the diesel fuel reductant 66, but without use of $H_2$ is shown within bubbles 80, 82 through 85, 87 through 89, 91, and 94. The percent $NO_x$ reduction obtained using both the diesel fuel reductant 66, and $H_2$ injection into the exhaust gas stream 74 before the combination catalyst 14, is shown within bubbles 81, 86, 90, and 92 through 95. The average weighted $NO_x$ conversion for nine ESC steady state modes of operation provided a 44.5% $NO_x$ reduction with an 8.7% fuel penalty. However, the fuel penalties shown by these tests are inaccurate due to the use of an over sized fuel injector system, as discovered later. The major importance of these initial tests was proof that both the diesel fuel reductant 66 and the $H_2$ obtained from a reformer 68 are required to obtain a higher percentage of $NO_x$ reduction at lower exhaust gas temperatures. These tests also showed that the combination catalyst 14 provided greater than 60% $NO_x$ reduction or conversion in association with the test mode of bubbles 84 and 88. These tests also provided evidence that at the exhaust gas temperatures associated with the tests conducted as shown for bubbles 82, 83, 87, and 91, the temperature of the combination catalyst 14 to be too high to effectively utilize the diesel fuel reductant 66 for $NO_x$ reduction. Conversely, the tests provided evidence that for the two modes associated with bubbles 85 and 89, the percent $NO_x$ reduction or conversion was low as a result of the low temperature of the exhaust gas stream resulting in a low temperature for combination catalyst 14. At the low temperature indicated the combination catalyst 14 apparently was unable to activate the diesel fuel reductant 66. As indicated, these tests validated the use of reformer 68 to generate $H_2$, in this example. It was discovered that the $H_2$ assisted in activating the reductant, thereby increasing the activity of the combination catalyst 14 for providing more meaningful $NO_x$ reduction at the lower exhaust gas temperatures. Particularly note the test results associated with bubbles 86 and 90, showing a greatly improved $NO_x$ reduction with decreased fuel penalty, in comparison to the tests conducted without the injection of $H_2$ as represented by bubbles 85 and 89. Note that although a reformer 68 is shown in this example for providing the $H_2$, other devices can also be utilized for providing the necessary $H_2$, and in the extreme, a source of pure $H_2$ can be utilized, but is much less preferred in association with internal combustion engines. Also note that the reformer 68 used in the test, and the following test, converted the diesel fuel 66 into $H_2$, CO, and some cracked HC components. However, it was found that the CO and cracked HC components did not make any meaningful contribution for more effective $NO_x$ conversion at the lower exhaust gas temperatures. From these initial tests, it became apparent that the fuel penalty and $NO_x$ conversion could likely be further improved through adjustment of the combination catalyst 14 formulation, and by more accurately controlling the amount of diesel fuel 66 injected into the exhaust gas stream 74 as a reductant and into the reformer 68 to adjust the amount of H2 injected. Further engine testing results follows below.

Example 14

Figure 13:
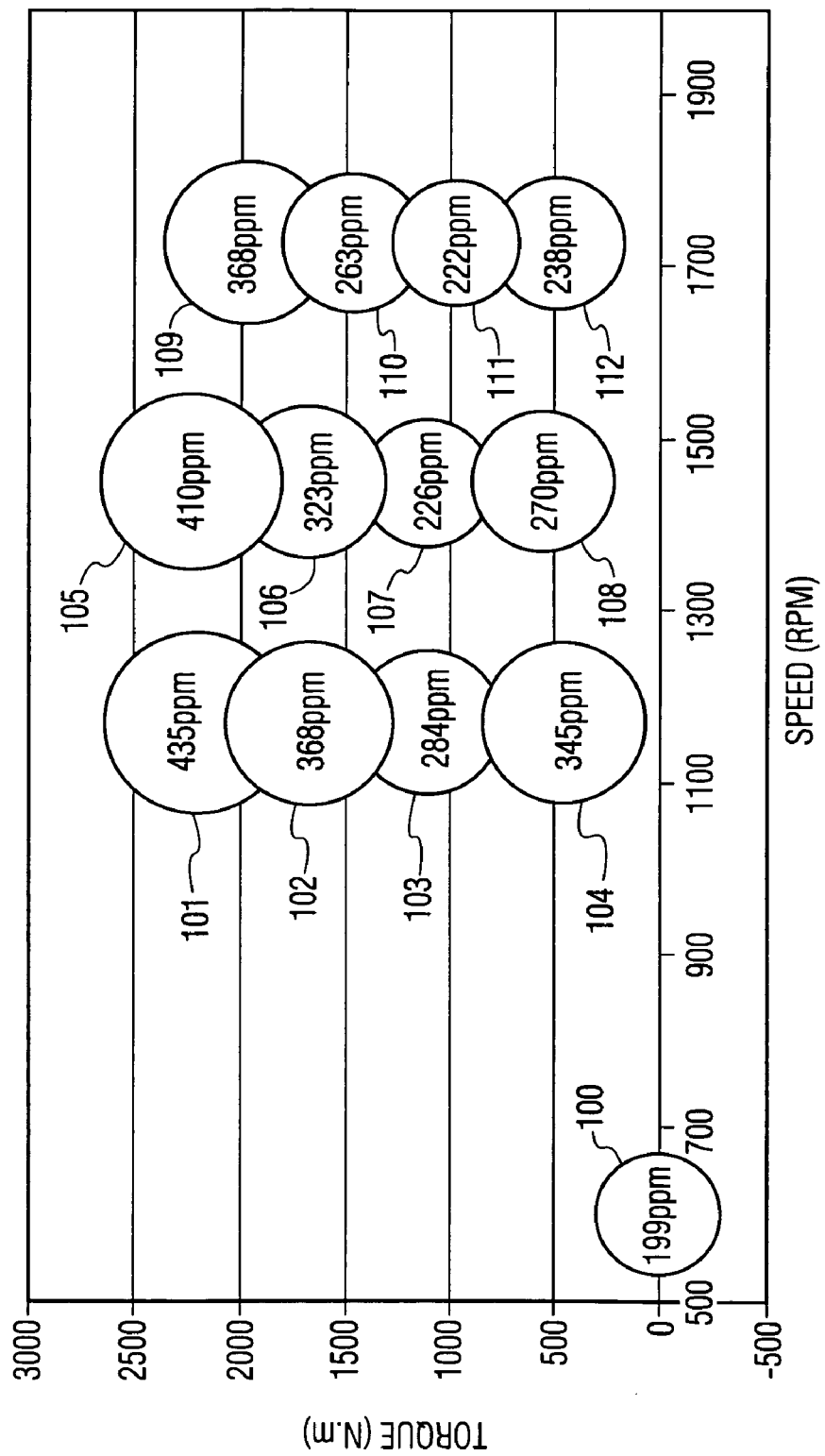
FIG. 13 is a bubble graph plotting torque versus speed for showing the engine-out NOx produced at different catalyst inlet temperatures and space velocities by a baseline engine provided by a 15 L Cummins ISX 500 hp 2004MY engine.

A second test was conducted using a 475 HP (horsepower), 2.5 g/bhp-hr $NO_x$ ISX 15 L Cummins engine. As shown in FIG. 13, baseline engine-out information for the aforesaid company's engine was first obtained. The bubble chart of FIG. 13 is charting torque versus speed, and showing $NO_x$ concentration in parts per million in each of the bubbles 100 through 112, for different combinations of exhaust gas temperature and space velocity, respectively. More specifically, the test modes conducted in association with bubbles 100 through 112, were for exhaust temperatures of 92° C., 423° C., 418° C., 424° C., 226° C., 465° C., 423° C., 374° C., 254°

C., 488° C., 413° C., 377° C., and 238° C., respectively. The space velocity associated with the test modes of bubbles 100 through 112 were 6 k, 37 k, 28 k, 20 k, 18 k, 49 k, 37 k, 28 k, 23 k, 52 k, 43 k, 34 k, and 29 k, respectively. The engine-out $NO_x$ concentration in each of the test modes for bubbles 100 through 112 is indicated within each of the bubbles.

Figure 14:
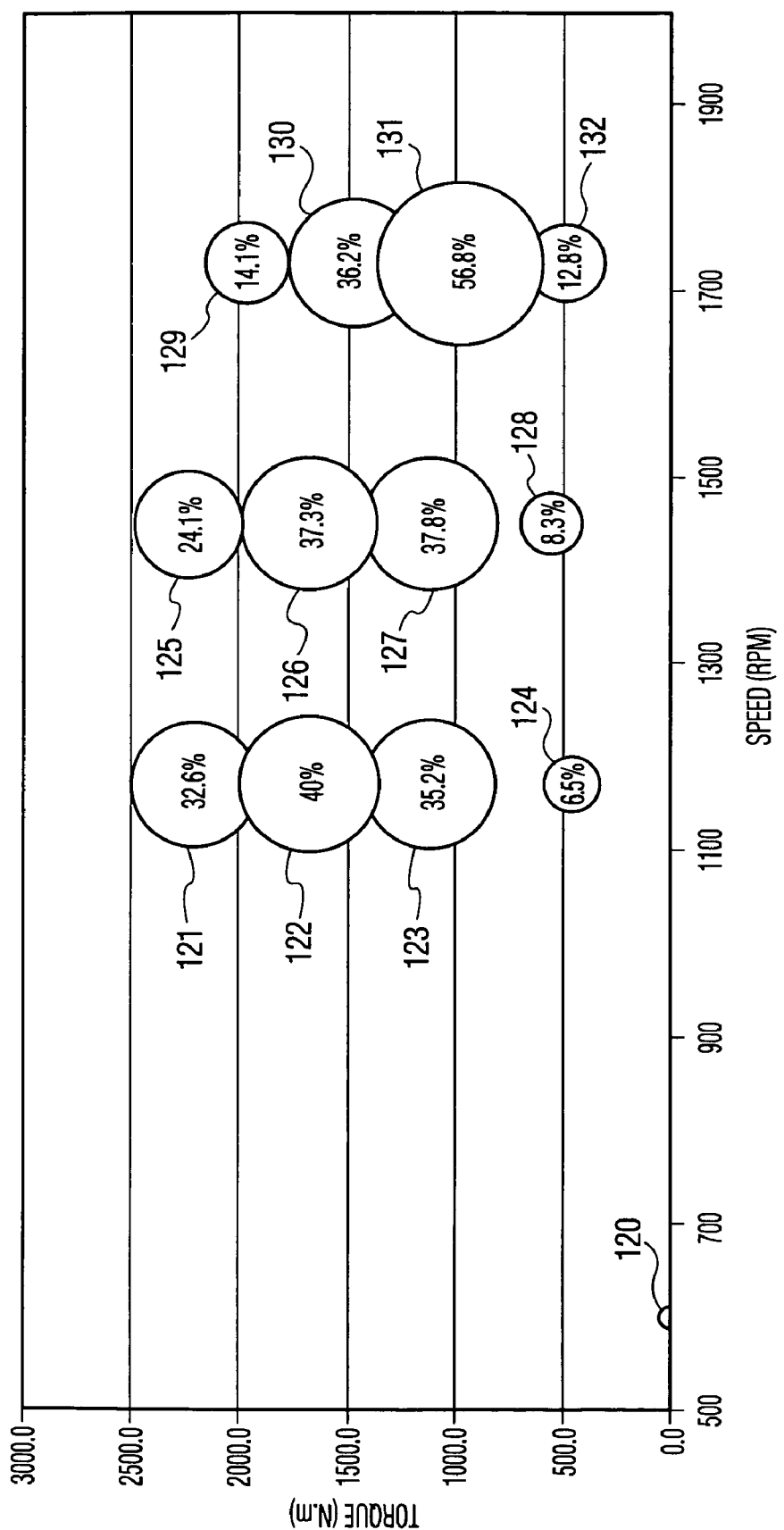
FIG. 14 is a bubble graph plotting torque versus speed of the baseline engine of FIG. 13 for showing NOx conversion and fuel penalty when using the present combination catalysts for a 13 mode steady state cycle at multiple outlet temperatures and space velocities with in-pipe fuel injection.

The combination catalyst 14 for the following test included the catalysts 20 and 22 in a dual configuration, for providing a total catalyst volume of 34 L (4 bricks total, two pairs of silver alumina for catalyst 20, and zeolite for catalyst 22). In FIG. 14, a bubble chart is shown plotting the torque versus engine speed in which only a diesel fuel reductant was injected into the exhaust gas stream 74. The bubbles are illustrative of the $NO_x$ conversion and fuel penalty (not shown) obtained through use of the combination catalyst 14 for a thirteen mode steady-state cycle. These modes are shown as bubbles 120 through 132. The gas stream exhaust temperatures associated with bubbles 120 through 132 were 92° C., 511° C., 504° C., 454° C., 236° C., 511° C., 504° C., 404° C., 252° C., 536° C., 467° C., 412° C., and 244° C., respectively. The associated space velocity for each of test modes associated with bubbles 120 through 132 were 6 k, 34 k, 30 k, 20 k, 17 k, 43 k, 38 k, 30 k, 23 k, 49 k, 44 k, 35 k, and 30 k, respectively. The percent $NO_x$ reduction obtained in each of the tests as represented by bubbles 121 through 132 are shown within each bubble respectively. Note that these tests were conducted over combination catalyst 14 with in pipe diesel fuel reductant 66 injection only, as previously indicated. The fuel penalty encountered in the test modes associated with bubbles 121 through 132 were 7.0%, 9.2%, 6.7%, 9.1%, 4.9%, 8.2%, 7.0%, 6.4%, 5.1%, 7.5%, 6.9%, and 6.4%, respectively. As shown for the test mode represented by bubble 131, the combination catalyst 14 performed a relatively high level of $NO_x$ reduction. However, the performance of the combination catalyst 14 diminished both at low torque or load modes as represented by bubble 124, 128, and 132, respectively, and at high torque or load mode as represented by bubbles 121, 125, and 129, respectively, both as a result of the catalyst temperature encountered because of the temperature of the exhaust gas. More specifically, at the low load or torque mode, the combination catalyst 14 temperature was too low (less than 252° C.) to properly evaporate the diesel fuel reductant 66. Contrariwise, at the previously mentioned high torque or load modes, the injected diesel fuel reductant 66 is believed to have combusted before being utilized for $NO_x$ conversion by the combination catalyst 14, as a result of the high temperature of the exhaust gas stream 74.

Figure 15:
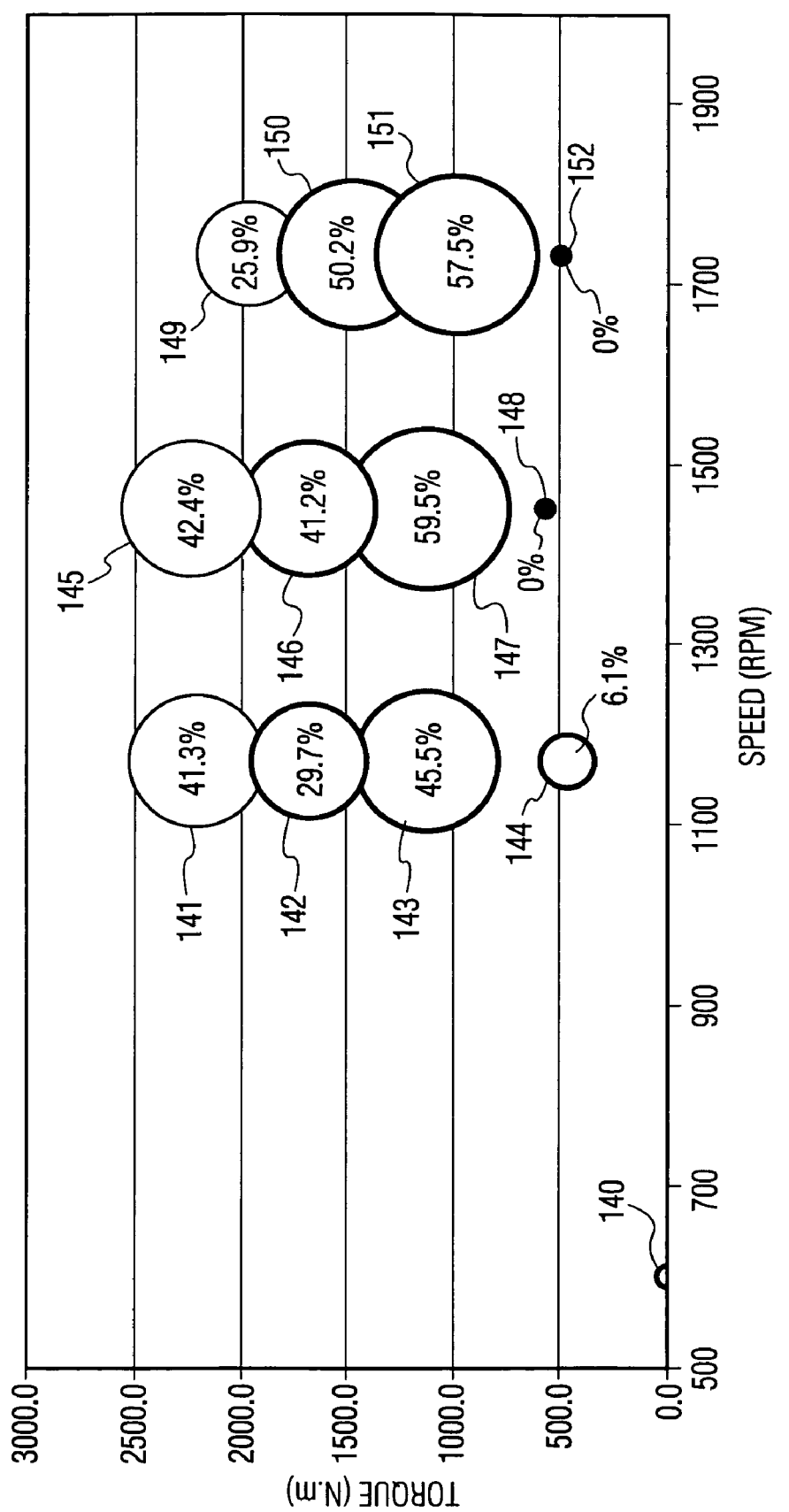
FIG. 15 is a bubble graph plotting torque versus speed of the baseline engine of FIG. 13 for showing NOx conversion and fuel penalty (not shown on chart) when using the present combination catalysts without a diesel fuel reductant, with a diesel fuel reductant only, with $H_2$ only, and with a diesel fuel reductant and $H_2$ from a reformer. Bubbles 140, 144, 148 and 152 are with reformer only (which means $H_2$ only). Bubbles 141, 145 and 149 are with diesel fuel only. Bubbles 142, 143, 146, 147, 150 and 151 are with diesel fuel plus a reformer providing $H_2$.

Reference is now made to the tests conducted and shown in the bubble chart of FIG. 15. This bubble chart shows thirteen test modes associated with bubbles 140 through 152. The temperature of the exhaust gas stream 74 associated with each of bubbles 140 through 152 are 100° C., 500° C., 488° C., 467° C., 236° C., 507° C., 486° C., 417° C., 253° C., 562° C., 476° C., 427° C., and 250° C., respectively. Also, the percent fuel penalty associated with each of bubbles 140 through 152 are 33%, 5.4%, 4.9%, 6.0%, 7.6%, 4.5%, 6.4%, 5.7%, 7.6%, 5.5%, 6.0%, 5.6%, and 6.9%, respectively. The percent $NO_x$ conversion or reduction is indicated within each one of the bubbles 140 through 152, or adjacent thereto. The bubbles 141, 145, and 149 show the test results conducted with the injection of a diesel fuel reductant 66, but without the injection of hydrogen 72 into the exhaust gas stream 74. Bubbles 140, 144, 148, and 152 were conducted only with injection of $H_2$. Bubbles 142, 143, 146, 147, 150, and 151 were conducted with diesel fuel reductant 76, and $H_2$ 72 injected into the exhaust gas stream 74. Tests associated with bubbles 140, 144, 148 and 152 were conducted without any injection of diesel fuel reductant 66 due to too low a temperature, but with a maximum amount of $H_2$ (20%) from the reformer. From these tests, with the exclusion of the test results from bubbles 140, 144, 148, and 152, it was determined that the average weighted NOx conversion utilizing the other nine steady-state modes of bubbles 141-143, 145-147, and 149 through 151 is approximately 44%, with approximately a 5.6% fuel penalty. Again, as with previous tests illustrated, it is believed that the fuel penalty can be further improved through use of a more sophisticated injection strategy than used in the tests illustrated. It is believed that in some of the test modes an unnecessary amount of diesel fuel reductant, in this example, was injected into the exhaust gas stream 74 because the tests were performed with a fixed $C/NO_x$ ratio. Note also that in association with the test modes for bubbles 140, 144, 148, and 152, unlike other test modes, the reformer 68, in this example, was configured to produce a maximum amount of $H_2$ 72 of about 20%. It is believed that the low exhaust gas temperatures for these four tests, and possibly the use of incorrect proportions of $H_2$ for the test modes of bubbles 140, and 144, were at least responsible in part for the negligible $NO_x$ conversion or reduction obtained. For the test modes associated with bubbles 143, 147, 150, and 151, improvements in $NO_x$ reduction or conversion were verified for the use of $H_2$ 72 and diesel fuel reductant 66 injection into the exhaust gas stream 74. For the latter test, the $NO_x$ conversion was in the range of 45% to 60%. Also, from these tests, the data obtained showed that good performance was obtained for $NO_x$ through injection into the exhaust gas stream 74 of both the diesel fuel reductant 66 and $H_2$ 72 with the optimal temperature of the exhaust gas stream being approximately 450° C. At exhaust gas stream 74 temperatures greater than 475° C., such as in test modes associated with bubbles 141, 145, and 149, the exhaust gas stream 74 was too high to obtain any benefit from utilizing $H_2$. From these tests, it was shown that the advantage of using reformate $H_2$ 72 for $NO_x$ conversion clearly diminished at temperatures higher than about 500° C. These tests further provide an indication that use of a reformer 68 for generating $H_2$, or some other source of $H_2$, may not be required throughout all ranges of engine operation, and is dependent upon the temperature level of the exhaust gas stream 74 at any given time. Accordingly, it appears that through use of a properly programmed controller, as previously indicated, the fuel penalty in any given mode of operation can be improved.

Although various embodiments of the disclosure have been shown and described, they are not meant to be limiting. Those of skill in the art may recognize various modifications to these embodiments, which modifications are meant to be covered by the spirit and scope of the appended claims.

What is claimed is:

1. An apparatus for catalytically processing a gas stream passing therethrough to reduce the presence of $NO_x$ therein, said apparatus comprising:
    a combination catalyst having first and second catalysts positioned in a staged arrangement for catalytically processing the gas stream, said combination catalyst including:
        a first catalyst for catalytically processing the gas stream being selected from the group consisting of metal-containing alumina, metal oxide-containing alumina, or a combination thereof, wherein the metal is selected from the group consisting of silver, indium, gallium, tin and cobalt and mixtures thereof, said first catalyst having a first temperature at which peak catalytic activity occurs, said first catalyst being adapted for both converting a portion of $NO_x$ directly to $N_2$ and another portion to nitrogen-containing intermediates with a portion of $NO_x$ remaining; and a second catalyst being located downstream from the first catalyst for catalytically processing the gas stream subsequent to the first catalyst, said second catalyst being selected from the group consisting of a metal-containing zeolite, metal oxide-containing zeolite, or a combination thereof, wherein the metal is selected from the group consisting of copper, iron, cobalt, and silver and mixtures thereof, said second catalyst having a second temperature at which peak activity occurs, said second catalyst being adapted to facilitate the reaction of the remaining $NO_x$ and intermediates for further reduction into $N_2$, wherein the value of the second temperature is lower than the value of the first temperature;

a source of reductant for injection of reductant into said gas stream upstream of said combination catalyst, said reductant being a hydrocarbon compound;

an activator selected from the group consisting of hydrogen ($H_2$), oxygenated hydrocarbon, or a combination thereof, for injection thereof upstream of said combination catalyst, for activating said reductant to improve low temperature $NO_x$ conversion; and a reformer for providing said activator by converting a portion of said hydrocarbon from said source of reductant into at least one of $H_2$ and oxygenated hydrocarbon.

2. The apparatus of claim 1, wherein said gas stream consists of exhaust from a lean burn internal combustion engine, and said reductant consists of diesel fuel.

3. The apparatus of claim 1, further including:
controller means responsive to both the speed and exhaust temperature of said engine for controlling the amount of diesel fuel and activator injected into said gas stream.

4. The apparatus of claim 1, further including:
controller means responsive to the temperature of said gas stream for adjusting the amounts of said reductant and activator injected into said gas stream.

5. The apparatus of claim 1, wherein the first and second catalysts are abutted against one another.

6. The apparatus of claim 1, wherein the first and second catalysts are spaced apart at a distance from one another.

7. The apparatus of claim 1, wherein the first and second catalysts are present in an amount ratio ranging from about 1:2 to 2:1.

8. The apparatus of claim 1, wherein the first and second catalysts are present in an amount ratio of about 1:1.

9. The apparatus of claim 1, wherein the alumina is derived from a sol-gel synthesis process.

10. The apparatus of claim 1, wherein the metal is present in an amount of from about 1 to 15 weight percent based on the total weight of the first catalyst.

11. The apparatus of claim 1, wherein the metal is present in an amount of from about 2 to 5 weight percent based on the total weight of the first catalyst.

12. The apparatus of claim 1, wherein the first catalyst is silver-containing alumina.

13. The apparatus of claim 1, wherein the zeolite is selected from the group consisting of ZSM-5, ZSM-11, ZSM-35, MCM-22, MCM-49, MCM-56, Beta, ITQ-13, and MCM-68.

14. The apparatus of claim 1, wherein the metal is present in an amount of from about 2 to 15 weight percent based on the total weight of the second catalyst.

15. The apparatus of claim 1, wherein the metal is present in an amount of from about 3 to 11.5 weight percent based on the total weight of the second catalyst.

16. The apparatus of claim 1, wherein the second catalyst is copper-containing zeolite.

17. The apparatus of claim 1, wherein the first and second catalysts are in the forms selected from powders, pellets, monoliths, fluidized beds, and combinations thereof.

18. A method for reducing $NO_x$ contained in a gas stream resulting from a combustion process, said method comprising the steps of:
passing said gas stream through a combination catalyst having first and second catalysts positioned in a staged arrangement for catalytically reducing the $NO_x$, said combination catalyst comprising:
said first catalyst far catalytically processing the gas stream being selected from the group consisting of metal-containing alumina, metal oxide-containing alumina, or a combination thereof, wherein the metal is selected from the group consisting of silver, indium, gallium, tin and cobalt and mixtures thereof, said first catalyst having a first temperature at which peak catalytic activity occurs, said first catalyst being for both converting a portion of $NO_x$ directly to $N_2$ and another portion to nitrogen-containing intermediates with a portion of $NO_x$ remaining; and
said second catalyst being located downstream from the first catalyst for catalytically processing the gas stream subsequent to the first catalyst, said second catalyst being selected from the group consisting of a metal-containing zeolite, metal oxide-containing zeolite, or a combination thereof, wherein the metal is selected from the group consisting of copper, iron, cobalt, and silver and mixtures thereof, said second catalyst having a second temperature at which peak activity occurs, said second catalyst being adapted to facilitate the reaction of the remaining $NO_x$ and intermediates for further reduction into $N_2$, wherein the value of the second temperature is lower than the value of the first temperature;
injecting a reductant from a reductant source into said gas stream upstream of said combination catalyst;
reforming a portion of a reductant from the reductant source to obtain an activator selected from the group consisting of hydrogen ($H_2$), oxygenated hydrocarbon, or a combination thereof; and
injecting the activator into said gas stream upstream of said combination catalyst, to activate said reductant to improve low temperature $NO_x$ conversion.

19. The method of claim 18, wherein said reductant consists of a hydrocarbon compound.

20. The method of claim 18, wherein said gas stream consists of exhaust gas from a lean burn internal combustion engine, and said injecting step includes using diesel fuel for said reductant.

21. The method of claim 20, wherein said activator injecting step includes the step of reforming a portion of said diesel fuel to obtain the required amount of one of the group consisting of $H_2$, oxygenated hydrocarbon, or a combination thereof, at any given time.

22. The method of claim 20, further including the step of controlling individually the amounts of activator and diesel fuel injected into the gas stream, as a function of the temperature of said exhaust gas and engine speed.

23. The method of claim 21, wherein said reforming step uses a reformer, and said method further includes the step of:
controlling individually the amounts of activator from said reformer and diesel fuel injected into said exhaust gas as a function of its temperature and the engine speed at any given time.

24. The method of claim 18, further including the step of spacing apart said first and second catalysts.

25. A method for catalytically processing the exhaust gas stream from an internal combustion engine to reduce the presence of $NO_x$ therein, said method comprising the steps of:
- delivering the gas stream to a first catalyst being selected from the group consisting of metal-containing alumina, metal oxide-containing alumina, or a combination thereof, wherein the metal is selected from the group consisting of silver, indium, gallium, tin and cobalt and mixtures thereof for catalytically processing the gas stream, said first catalyst having a first temperature at which peak catalytic activity occurs, said first catalyst being adapted for both converting a portion of $NO_x$ directly to $N_2$ and another portion to nitrogen-containing intermediates with a portion of $NO_x$ remaining;
- conveying the gas stream from the first catalyst to a second catalyst located downstream from the first catalyst in a staged arrangement, said second catalyst being selected from the group consisting of a metal-containing zeolite, metal oxide-containing zeolite, or a combination thereof, wherein the metal is selected from the group consisting of copper, iron, cobalt, and silver and mixtures thereof, for catalytically further processing the gas stream subsequent to the first catalyst, said second catalyst having second temperature at which peak activity occurs, said second catalyst being adapted to facilitate the reaction of the remaining $NO_x$ and intermediates for further reduction into $N_2$, wherein the value of the second temperature is lower than the value of the first temperature;
- injecting a hydrocarbon compound reductant from a hydrocarbon reductant source into said exhaust gas stream upstream of said first catalyst;
- reforming a portion of a hydrocarbon reductant from the hydrocarbon reductant source to obtain an activator selected from the group consisting of hydrogen ($H_2$), oxygenated hydrocarbon, or a combination thereof; and
- injecting the activator into said exhaust gas stream upstream of said first catalyst to activate said reductant in a low temperature range relative to said exhaust gas stream to facilitate the reduction of $NO_x$ in the gas stream.

26. The method of claim 25, further including the step of spacing apart said first and second catalysts.

27. The method of claim 25, further including the steps of:
- controlling the amount of hydrocarbon compound injected as a function of both the exhaust gas stream temperature and engine speed; and
- controlling the amount of activator injected as a function of both the exhaust gas stream temperature and engine speed.

28. The method of claim 25, wherein said reductant consists of diesel fuel.

29. An apparatus for catalytically processing the exhaust gas stream from a lean burn internal combustion engine to reduce the presence of $NO_x$ therein, said apparatus comprising:
- a combination catalyst having first and second catalysts positioned in a staged arrangement for catalytically processing the gas stream, said combination catalyst including:
  - said first catalyst for catalytically processing the gas stream, being selected from the group consisting of metal-containing alumina, metal oxide-containing alumina, or a combination thereof, wherein the metal is selected from the group consisting of silver, indium, gallium, tin and cobalt and mixtures thereof, said first catalyst having a first temperature at which peak catalytic activity occurs, said first catalyst being adapted for both converting a portion of $NO_x$ directly to $N_2$ and another portion to nitrogen-containing intermediates with a portion of $NO_x$ remaining; and
  - said second catalyst being located downstream from the first catalyst for catalytically processing the gas stream subsequent to the first catalyst, being selected from the group consisting of a metal-containing zeolite, metal oxide-containing zeolite, or a combination thereof, wherein the metal is selected from the group consisting of copper, iron, cobalt, and silver and mixtures thereof, said second catalyst having a second temperature at which peak activity occurs, said second catalyst being adapted to facilitate the reaction of the remaining $NO_x$ and intermediates for further reduction into $N_2$, wherein the value of the second temperature is lower than the value of the first temperature;
- a source of hydrocarbon compound reductant for injecting the same into said gas stream upstream of said first catalyst;
- an activator selected from the group consisting of hydrogen ($H_2$), oxygenated hydrocarbon, or a combination thereof, for injection into said gas stream upstream of said first catalyst, for activating said reductant to improve $NO_x$ reduction in a low temperature range of said exhaust gas stream relative to the overall temperature range thereof;
- a reformer adapted for reforming a portion of said reductant into said activator; and
- a controller for individually adjusting the amounts of said reductant and activator injected as a function of both the temperature of the exhaust gas stream and engine speed.

30. The apparatus of claim 29, wherein said reductant consists of diesel fuel.

* * * * *